(12) United States Patent
Runstadler

(10) Patent No.: US 6,763,033 B1
(45) Date of Patent: Jul. 13, 2004

(54) RESET SEQUENCE FOR SEGMENTED COMPUTER NETWORK TOPOLOGY

(75) Inventor: Peter W. Runstadler, Holliston, MA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/384,705

(22) Filed: Aug. 27, 1999

(51) Int. Cl.[7] .............................................. H04L 12/42
(52) U.S. Cl. ...................................... 370/453; 370/457
(58) Field of Search ................................ 370/254–258, 370/400–406, 408, 389, 392, 393, 252, 453, 457; 709/220–222, 250–253

(56) References Cited

U.S. PATENT DOCUMENTS

| | | | | |
|---|---|---|---|---|
| 5,790,524 A | * | 8/1998 | Bennett et al. ............. | 370/244 |
| 5,799,015 A | * | 8/1998 | Bennett et al. ............. | 370/388 |
| 5,826,028 A | * | 10/1998 | Bennett et al. ............. | 709/222 |

OTHER PUBLICATIONS

P1394.2: SerialExpress– A Scalable Gigabit Extension to Serial Bus, Draft .784, May 3, 1997, IEEE.*
IEEE Standards Department, Microprocessor and Microcomputer Standards Subcommittee of the IEEE Computer Society, "P1394.2: SerialExpress–A Scalable Gigabit Extension to Serial Bus", May 2, 1997.

* cited by examiner

Primary Examiner—Frank Duong
(74) Attorney, Agent, or Firm—Westman, Champlin & Kelly

(57) ABSTRACT

A segmented computer network topology has a plurality of network hosts, which are coupled in a ring. A method of resetting the segmented computer network topology includes initiating a reset sequence having a flushing phase, a subsequent scrubber selection phase, a next subsequent slot identification phase and a next subsequent ring start-up phase. Selected packets received by the network hosts are flushed from the ring during the flushing phase. A single one of the network hosts is selected as a scrubber host during the scrubber selection phase. A unique slot identifier is assigned to each of the network hosts during the slot identification phase. A ring start-up packet is sent from the scrubber host to each of the other network hosts over the ring during the ring start-up phase.

19 Claims, 24 Drawing Sheets

| rPh Value | Name | Description |
|---|---|---|
| 0 | FLUSH | BusReset packet for the flushing phase of reset. |
| 1 | SCRUB_SEL | BusReset packet for the scrubber selection phase of reset. |
| 2 | SLOTID | BusReset packet for the slotID assignment phase of reset. |
| 3 | STARTUP | BusReset packet for the startup phase of reset. |

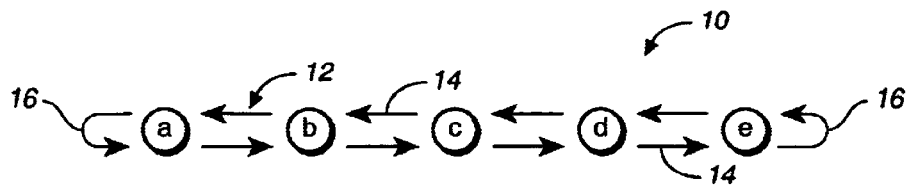
FIG._1
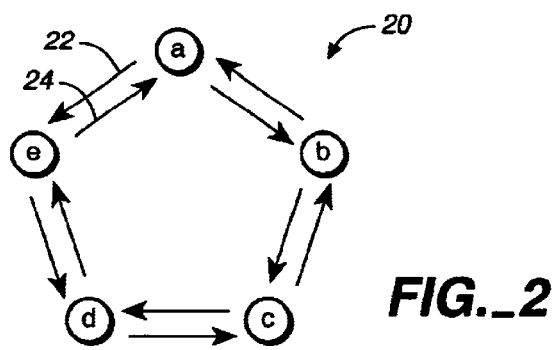
FIG._2
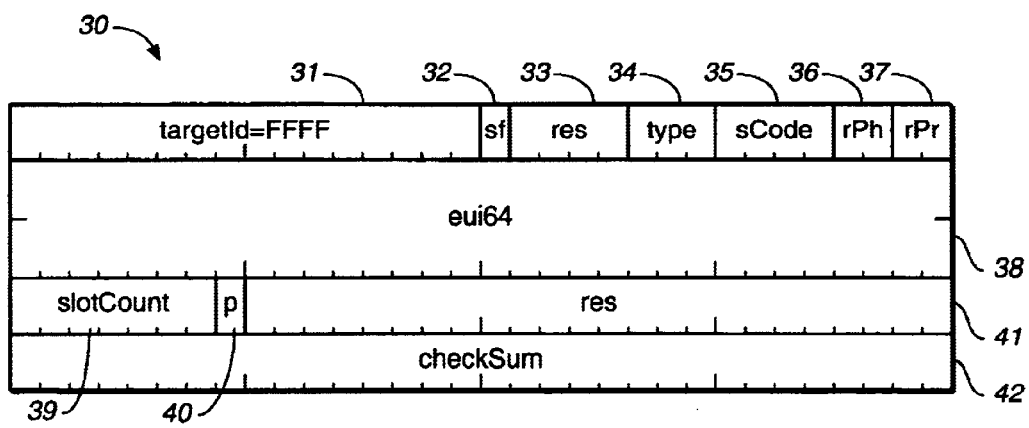
FIG._3
| rPh Value | Name | Description |
|---|---|---|
| 0 | FLUSH | BusReset packet for the flushing phase of reset. |
| 1 | SCRUB_SEL | BusReset packet for the scrubber selection phase of reset. |
| 2 | SLOTID | BusReset packet for the slotID assignment phase of reset. |
| 3 | STARTUP | BusReset packet for the startup phase of reset. |
FIG._4

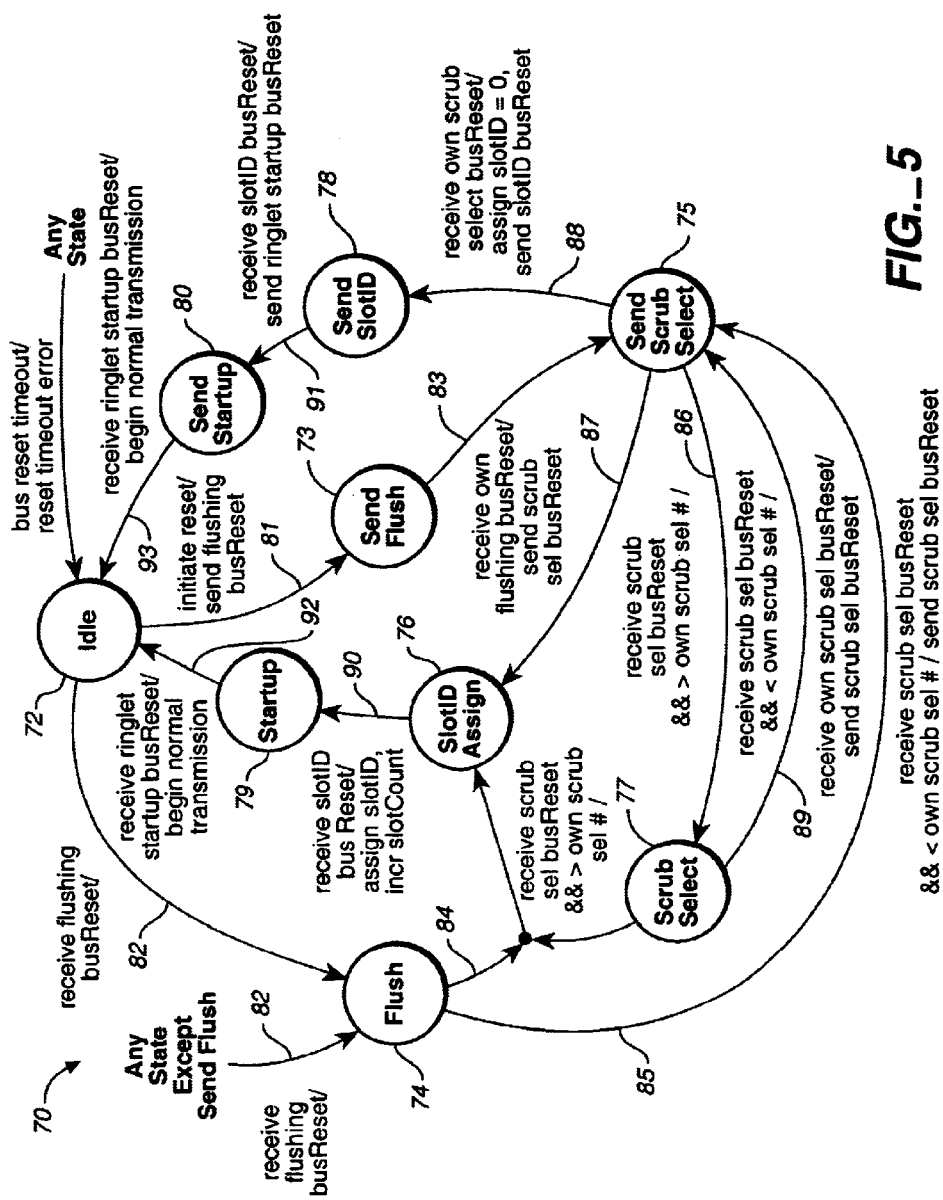
FIG._5

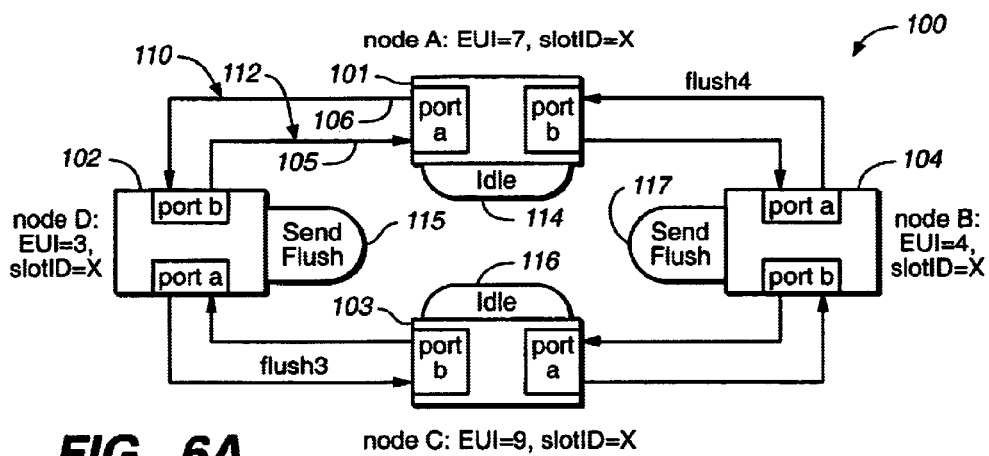
FIG._6A
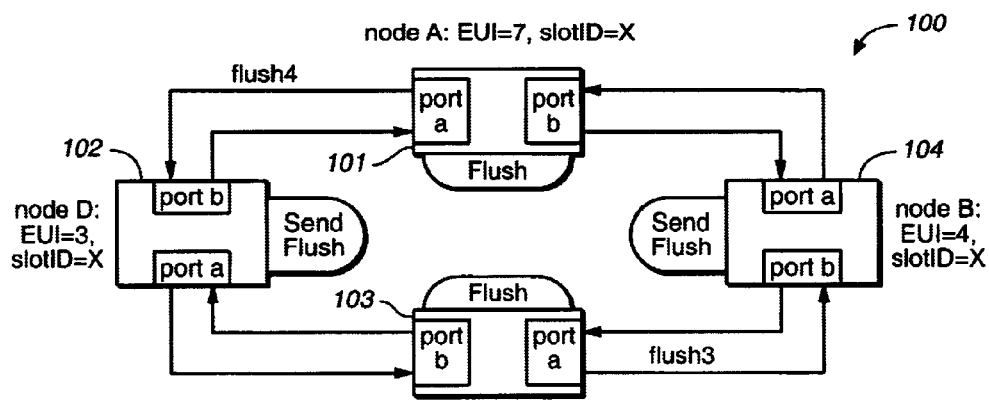
FIG._6B
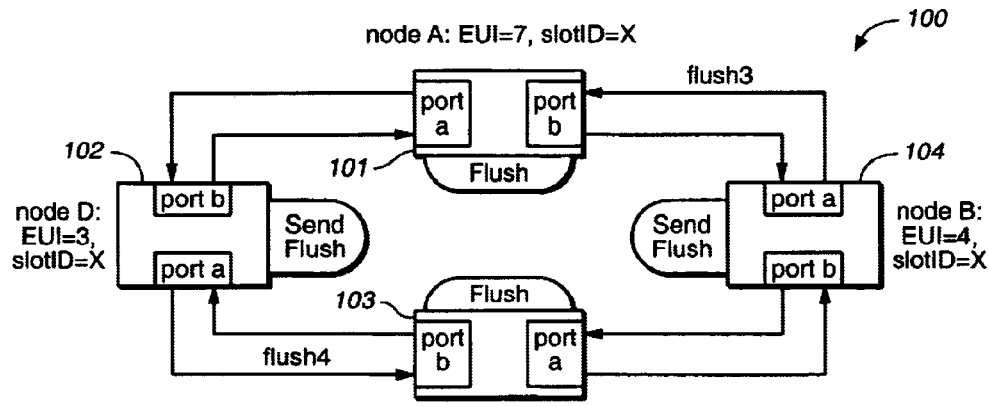
FIG._6C

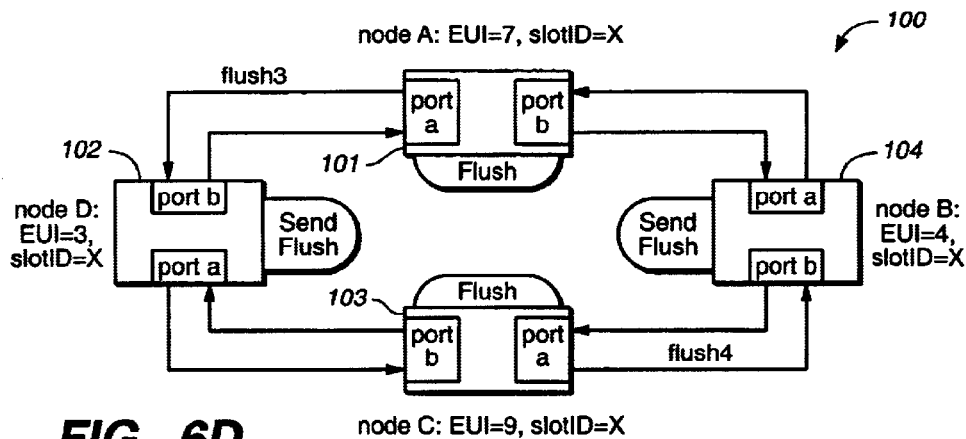
FIG._6D
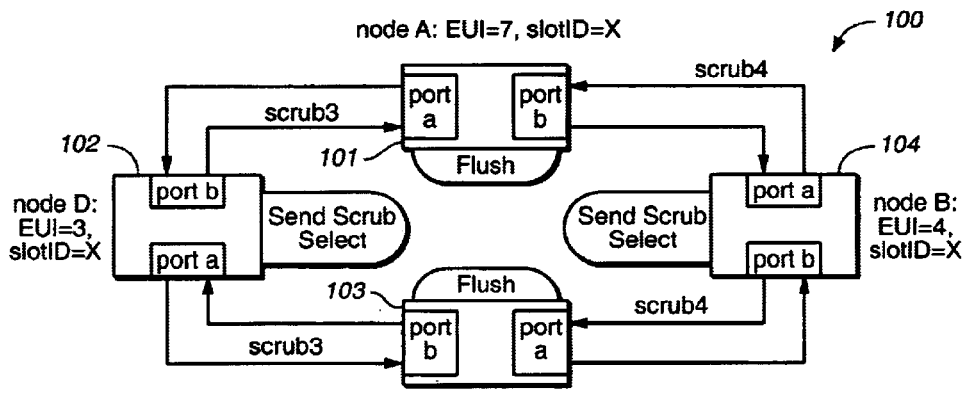
FIG._6E
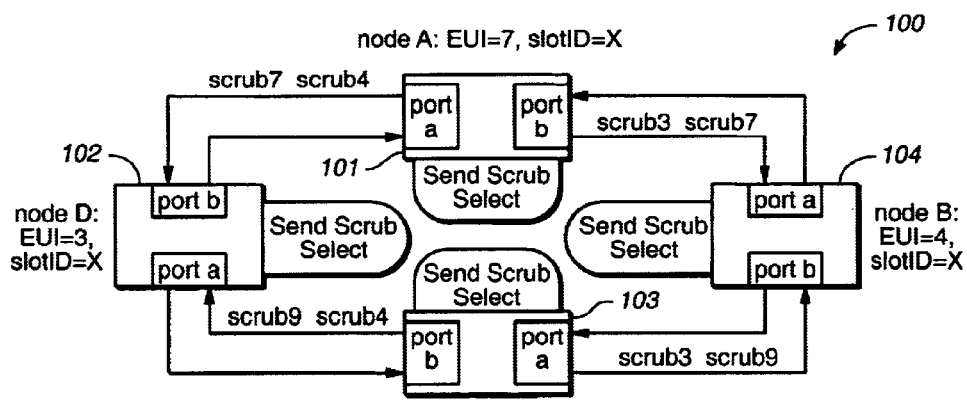
FIG._6F

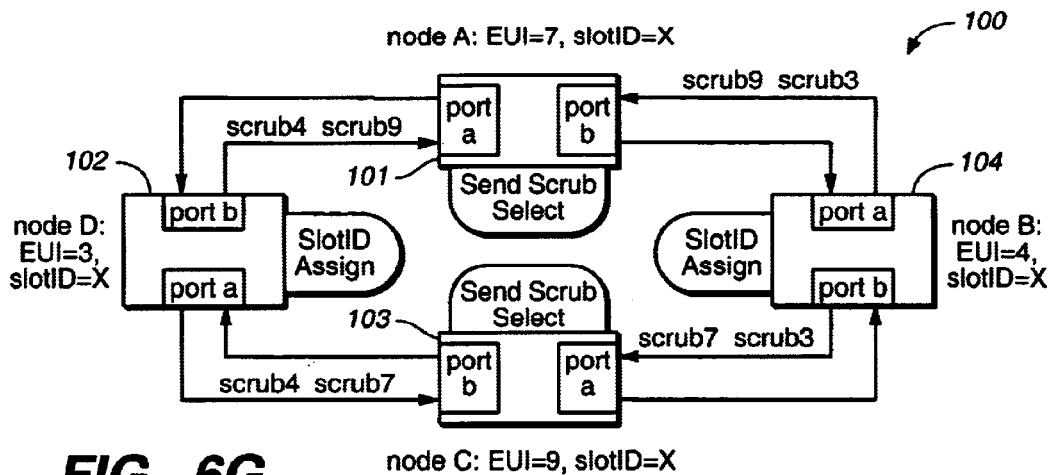
FIG._6G
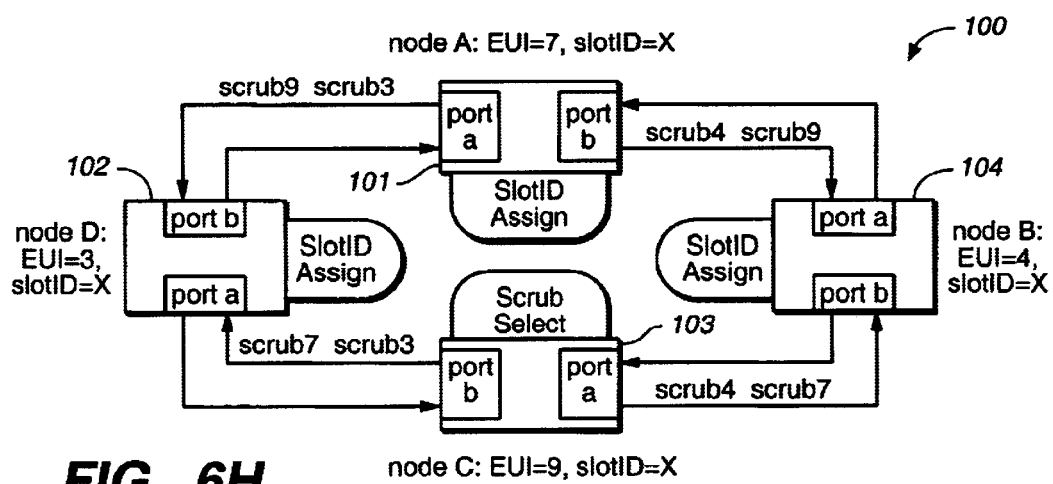
FIG._6H
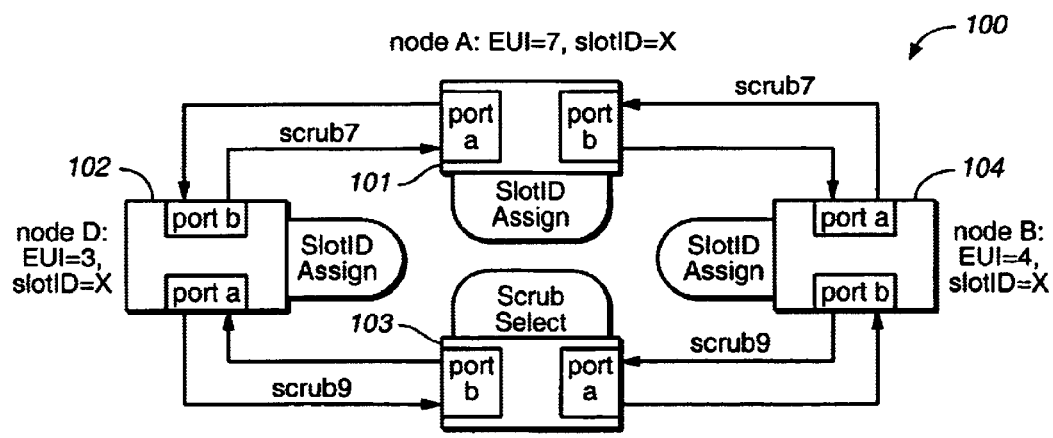
FIG._6I

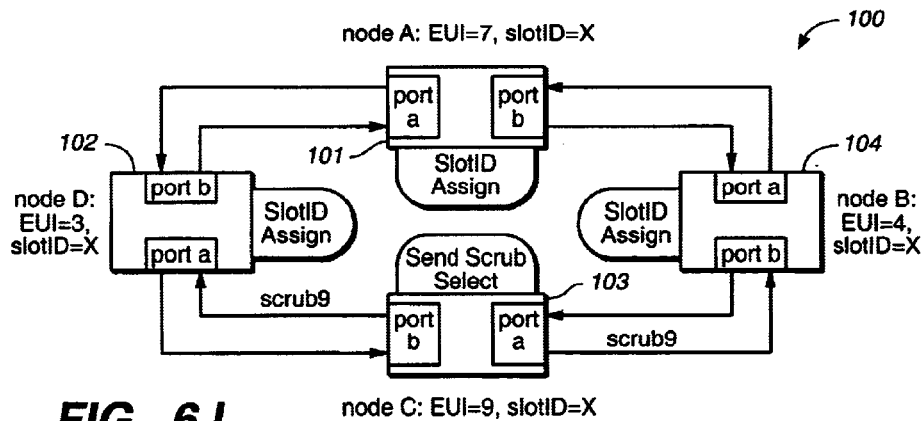
FIG._6J
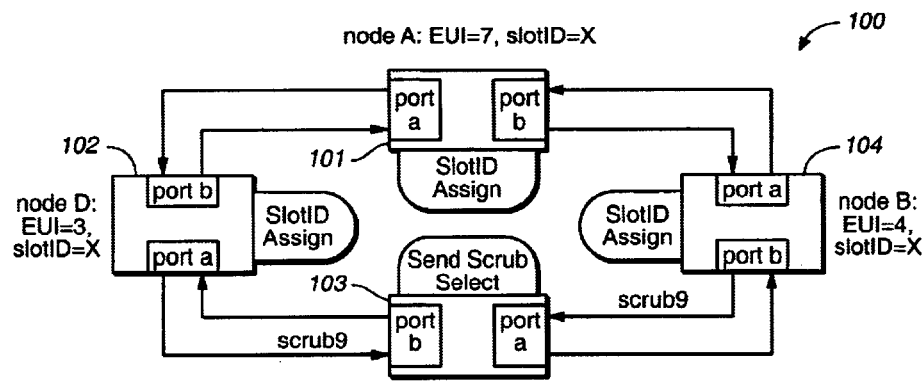
FIG._6K
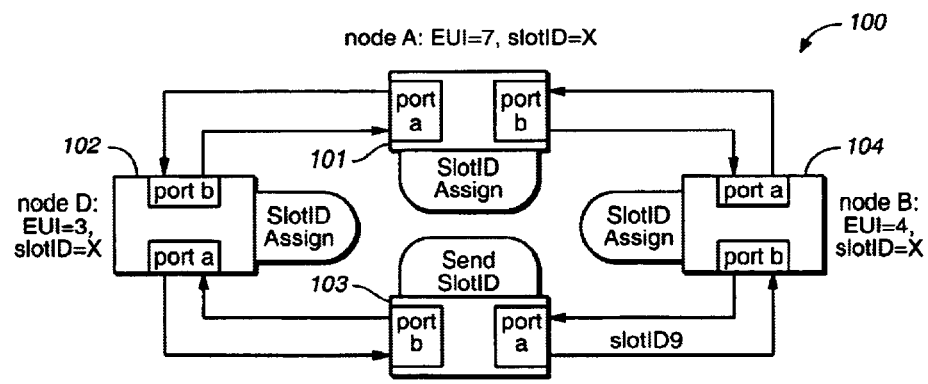
FIG._6L

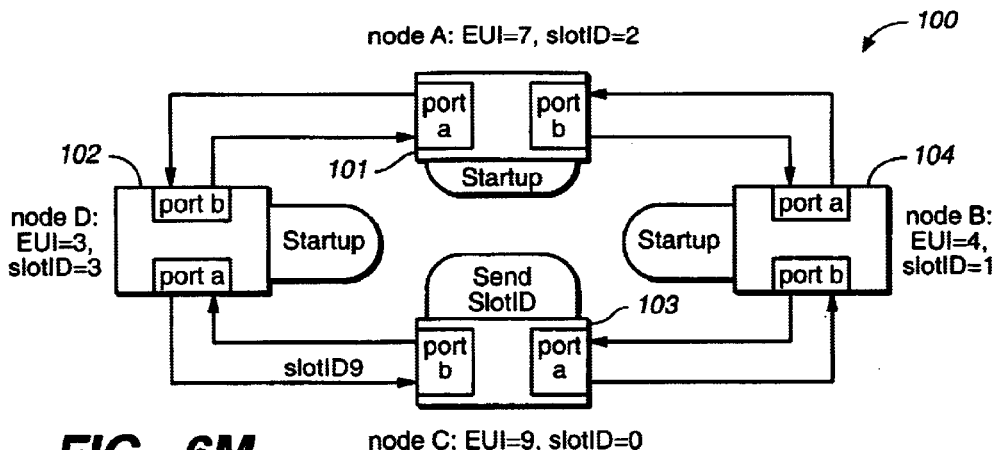
FIG._6M
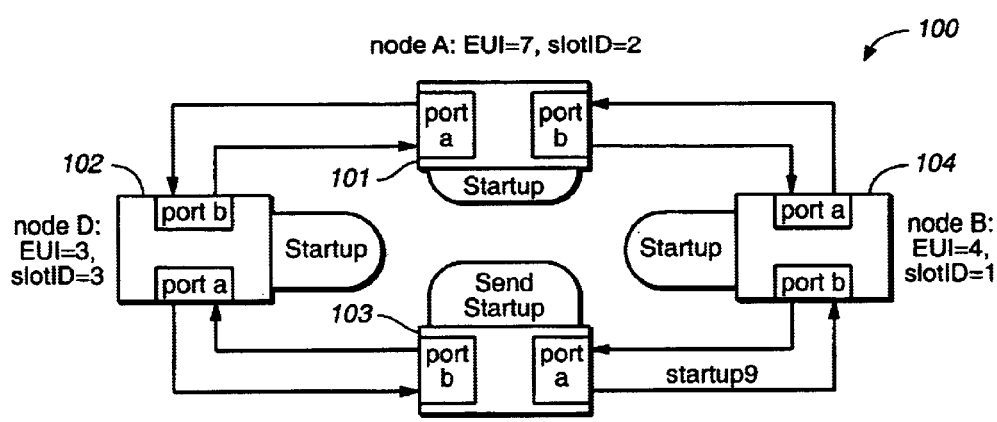
FIG._6N
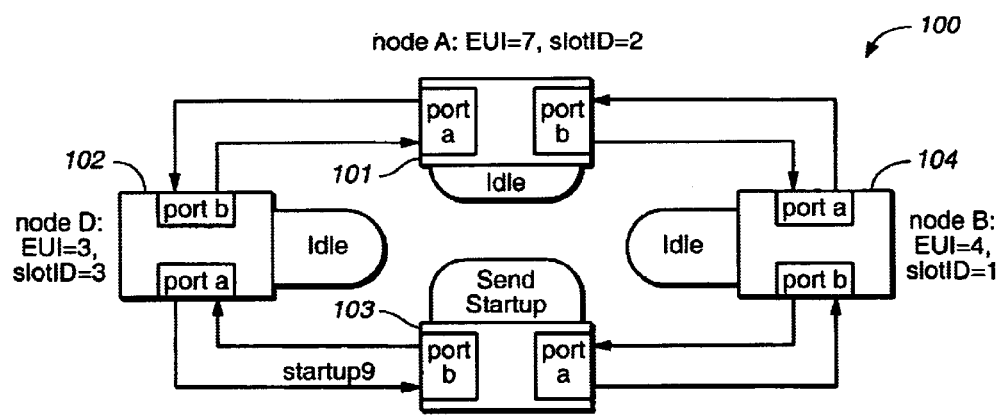
FIG._6O

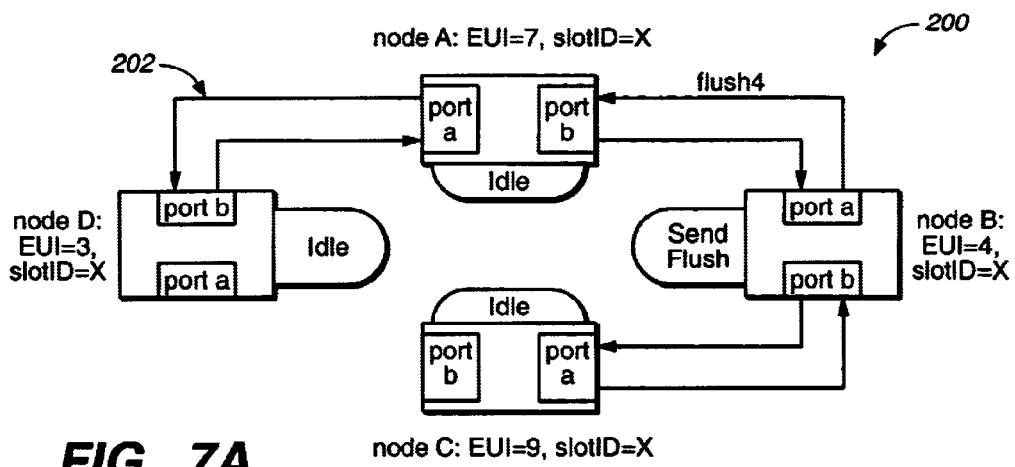
*FIG._7A*
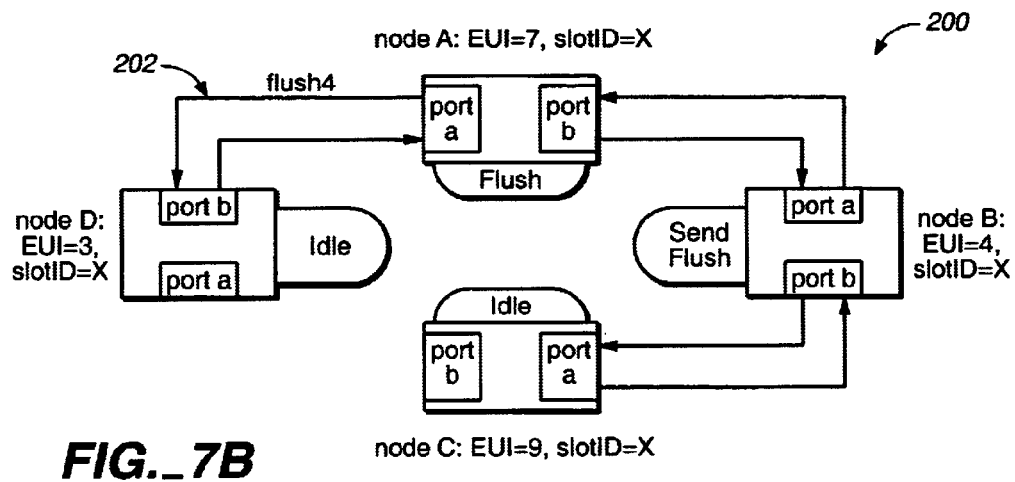
*FIG._7B*

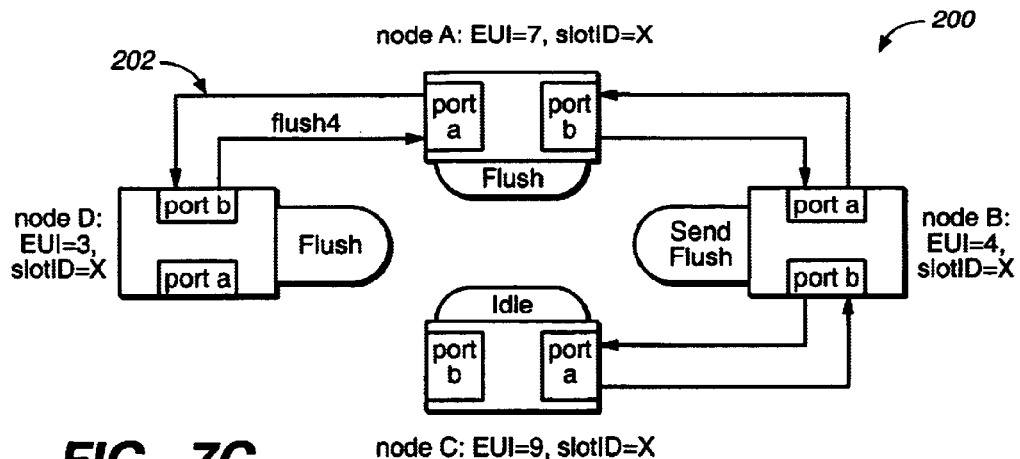
FIG._7C
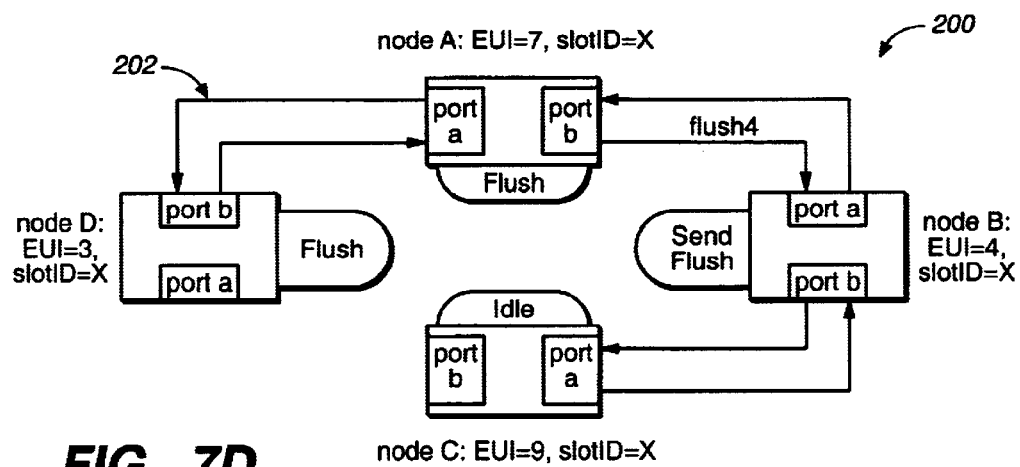
FIG._7D
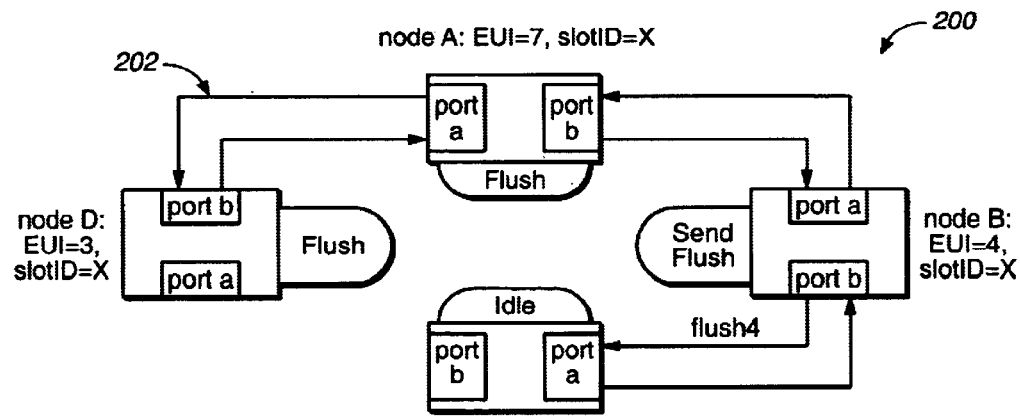
FIG._7E

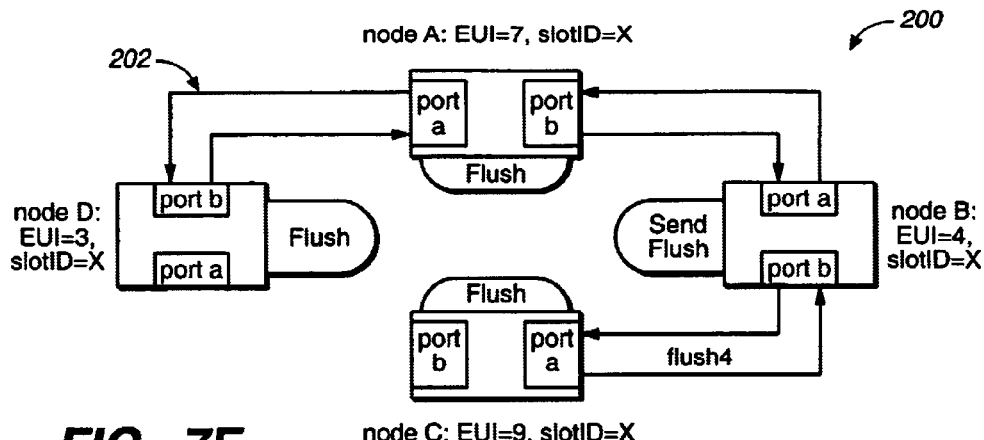
FIG._7F
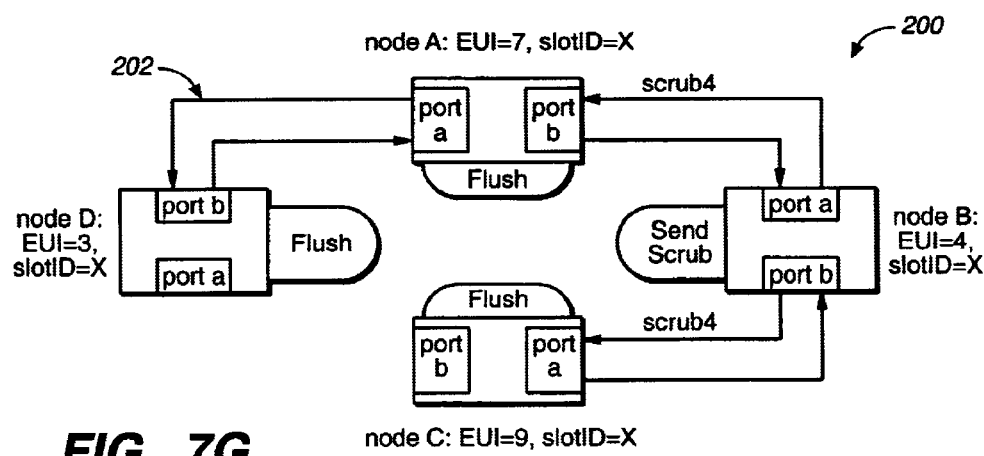
FIG._7G
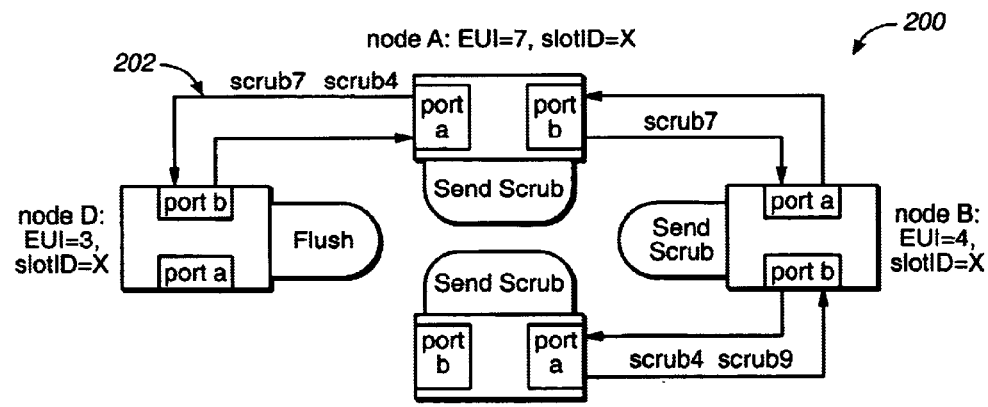
FIG._7H

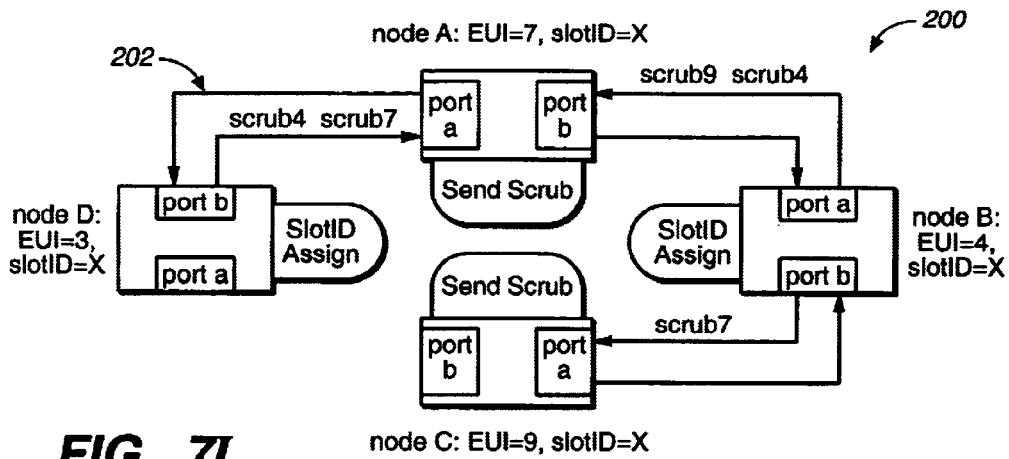
FIG._7I
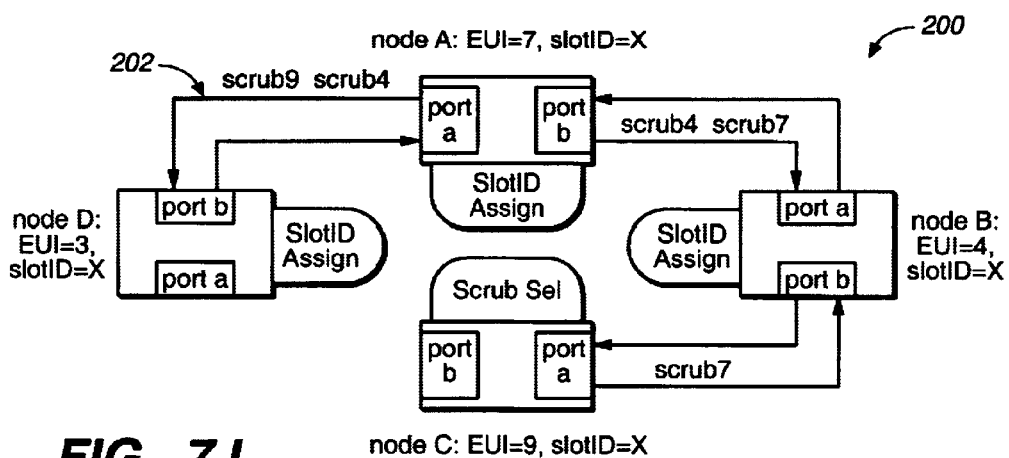
FIG._7J
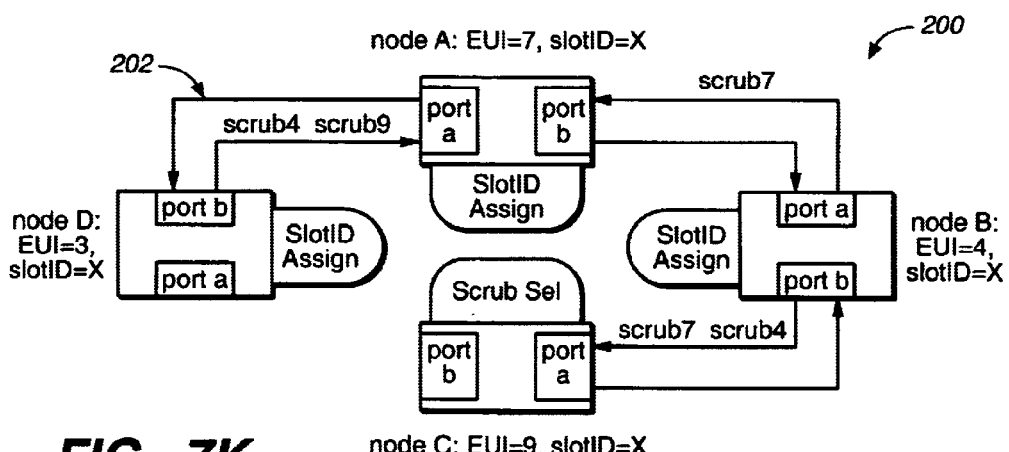
FIG._7K

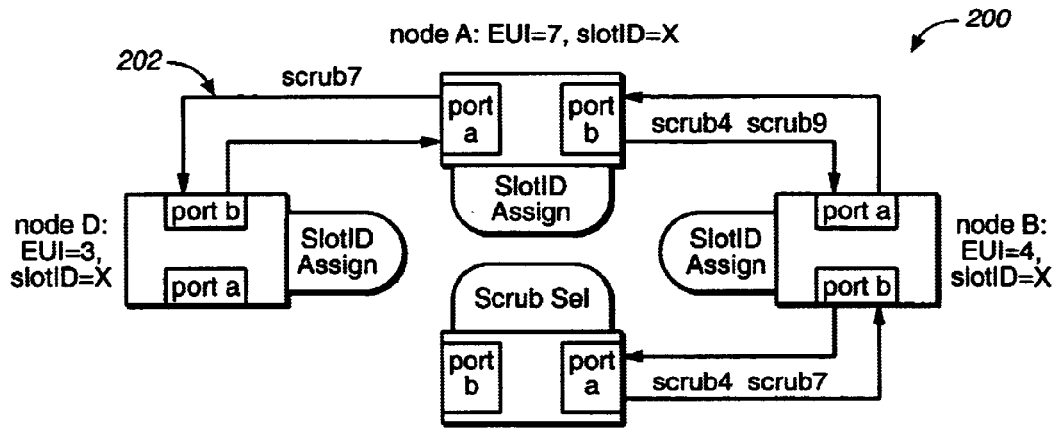
FIG._7L
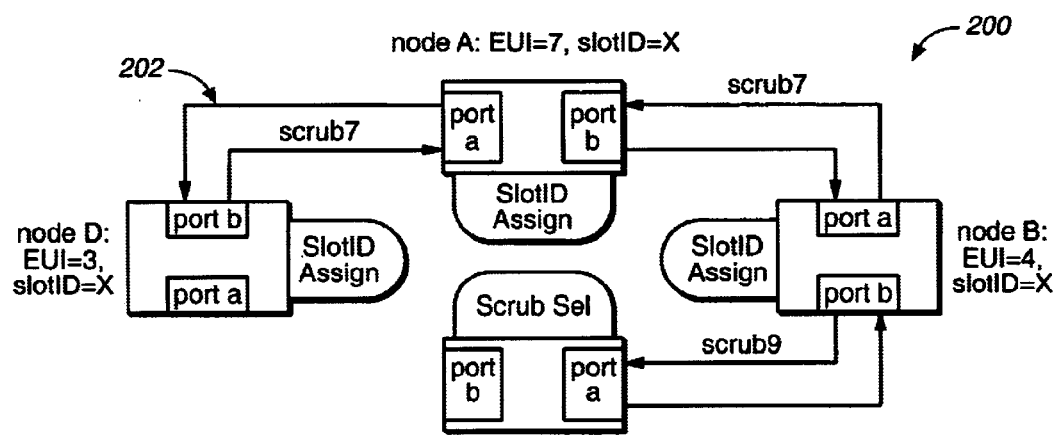
FIG._7M
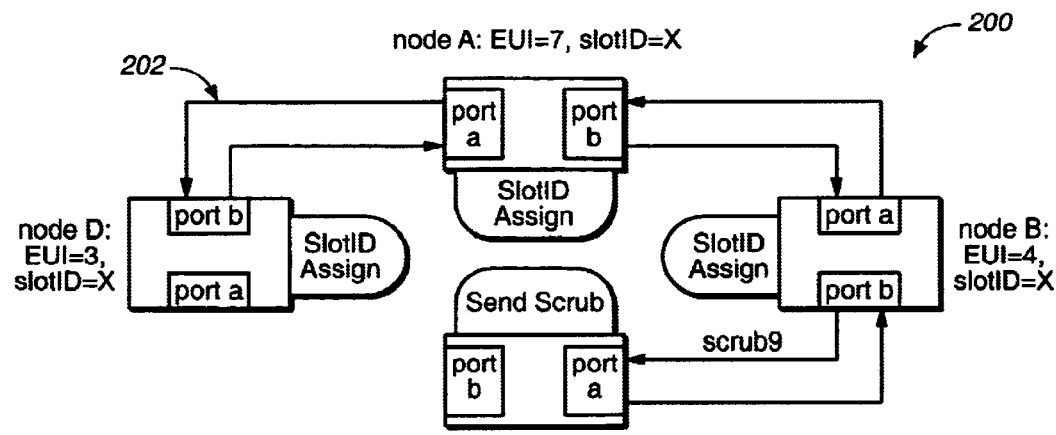
FIG._7N

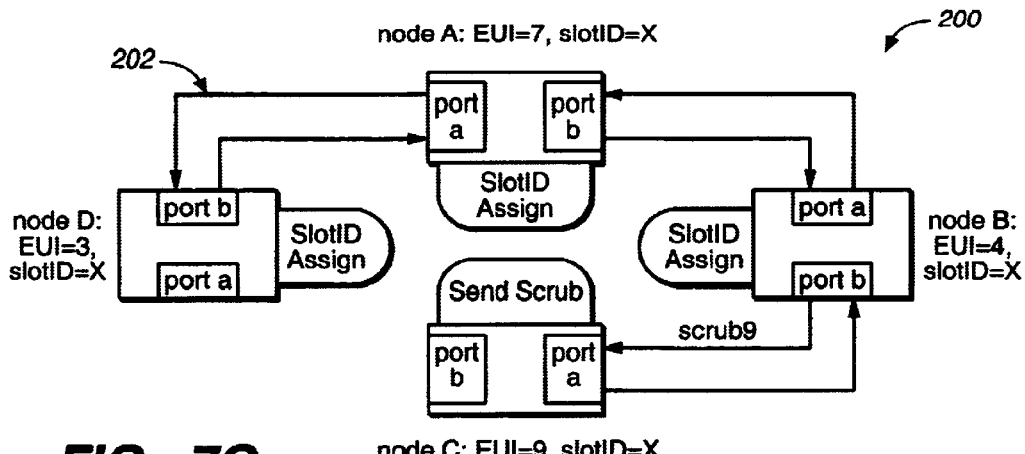
FIG._7O
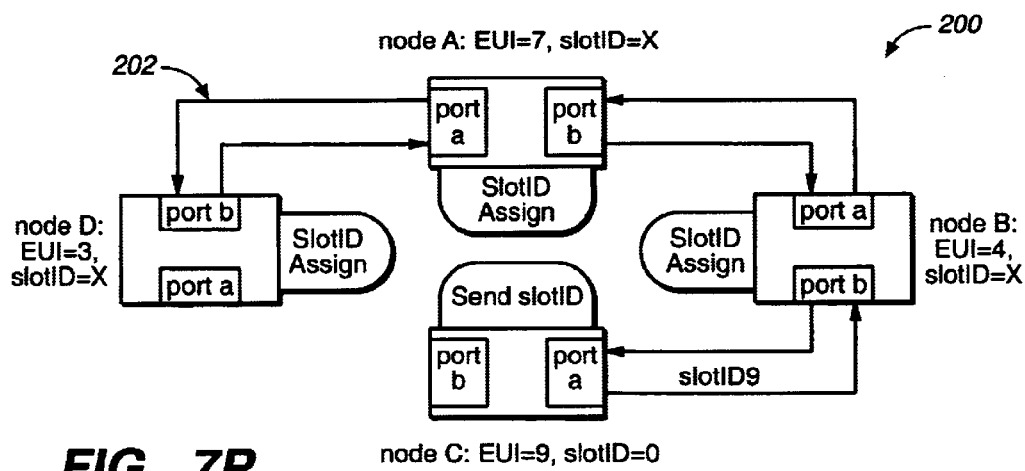
FIG._7P
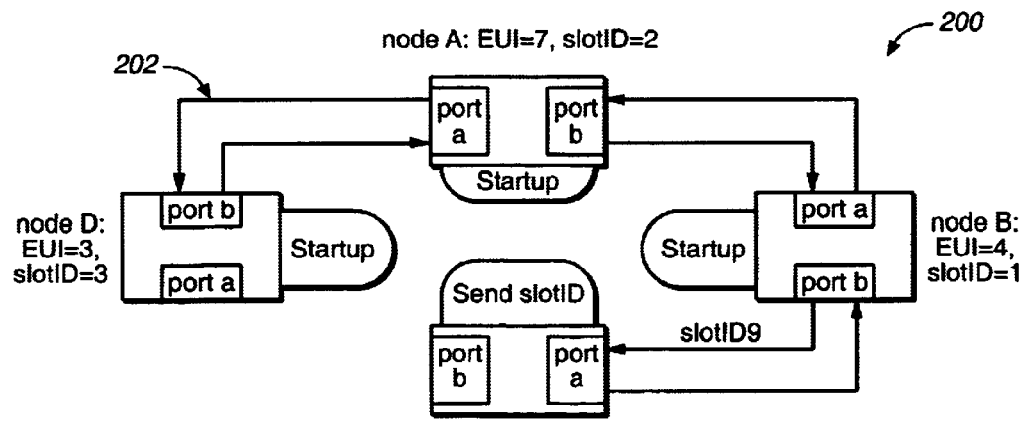
FIG._7Q

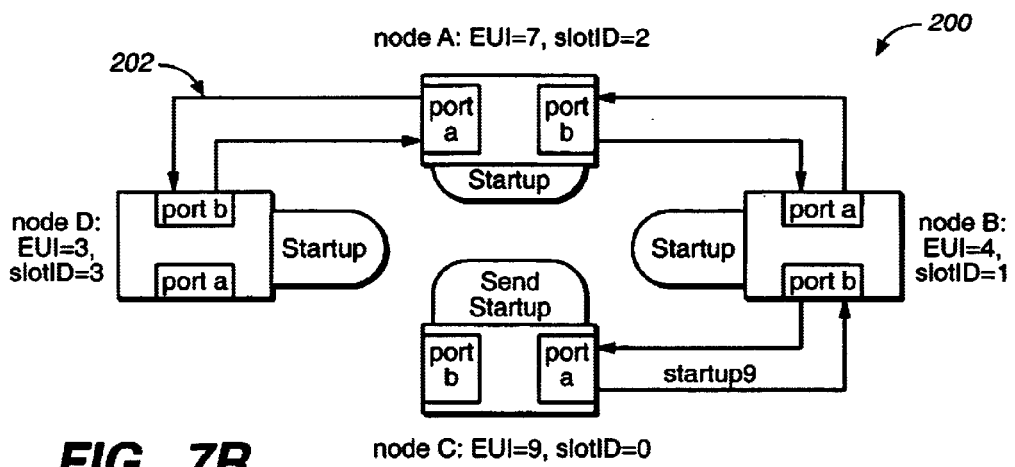
FIG._7R
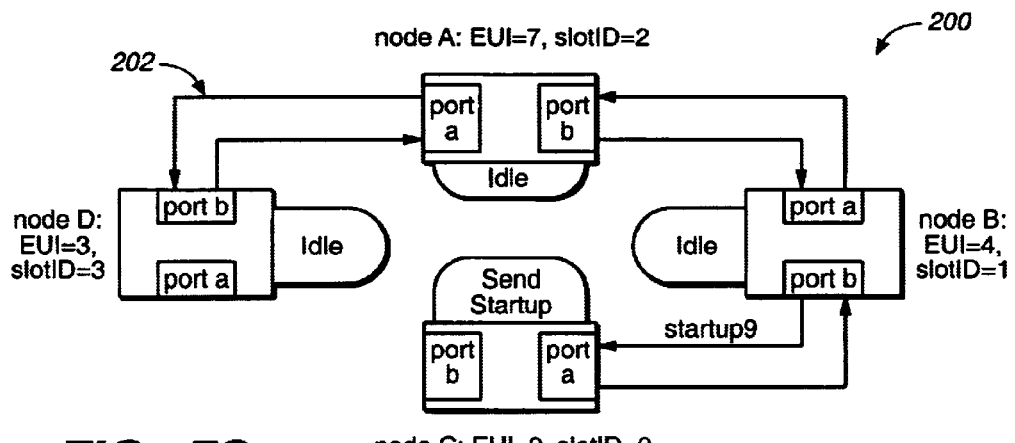
FIG._7S

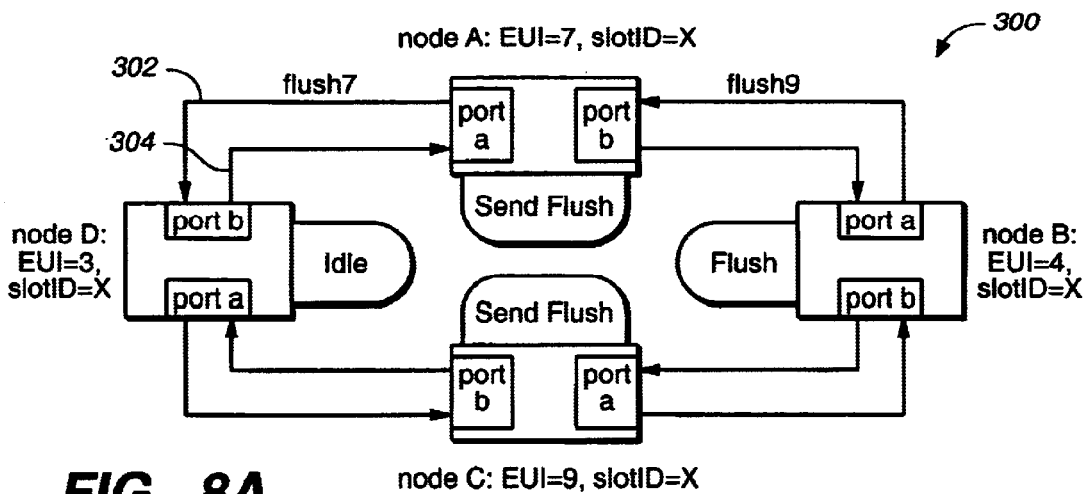
FIG._8A
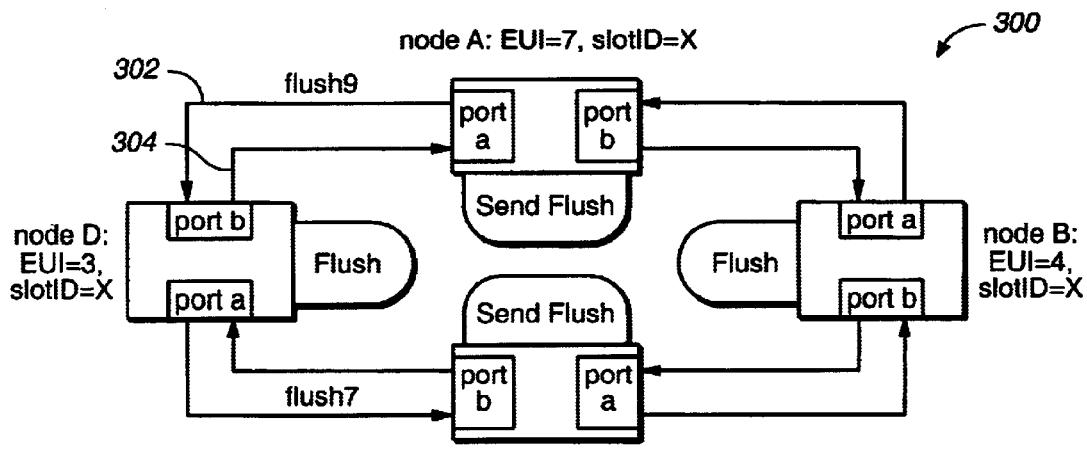
FIG._8B
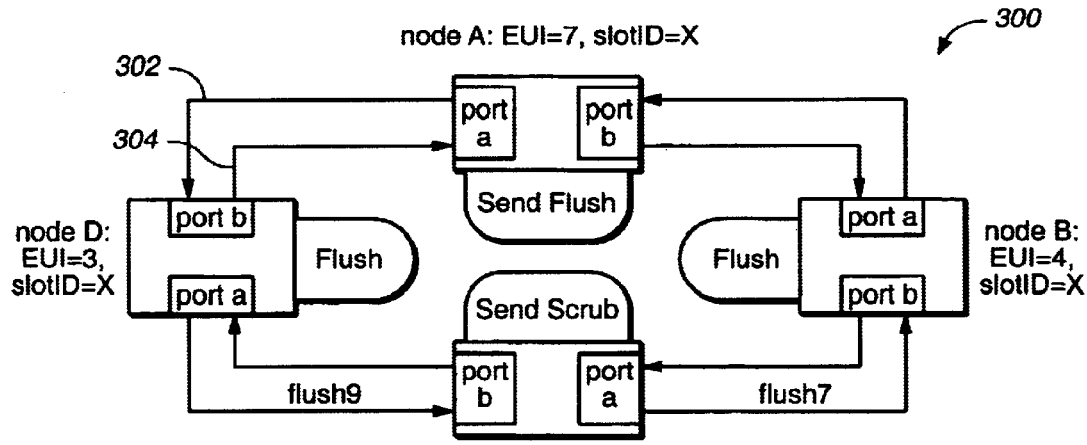
FIG._8C

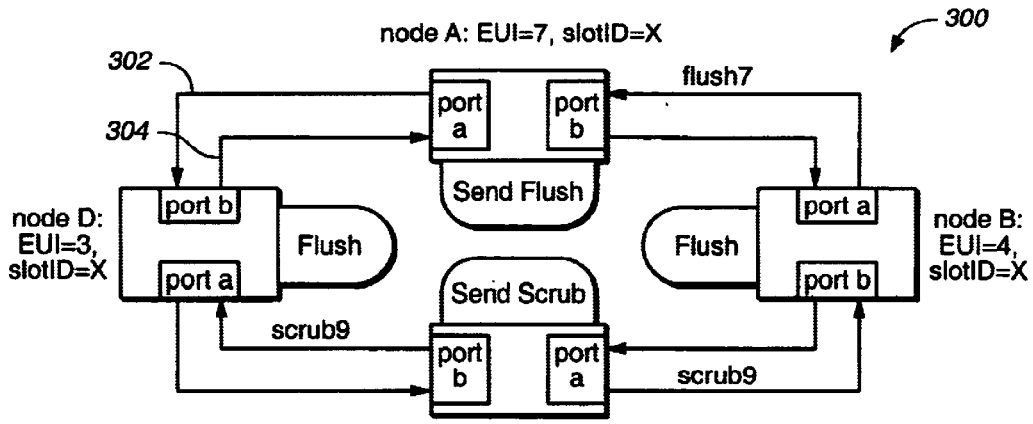
FIG._8D
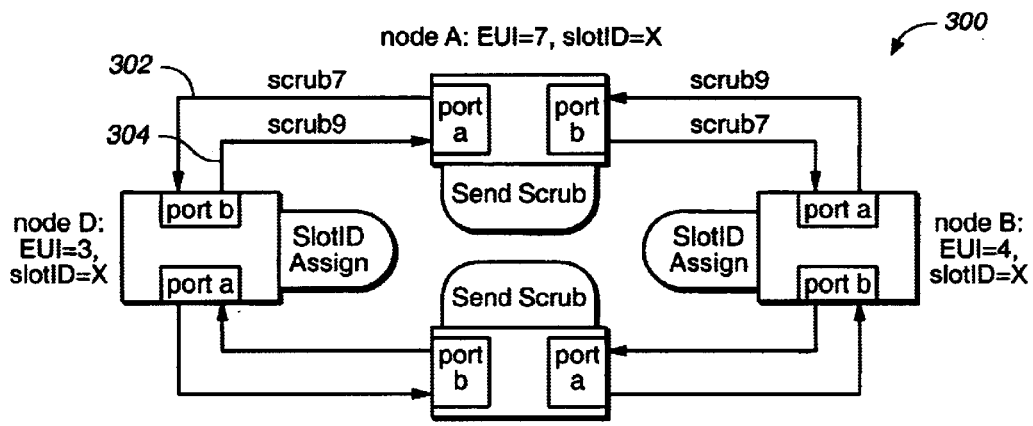
FIG._8E
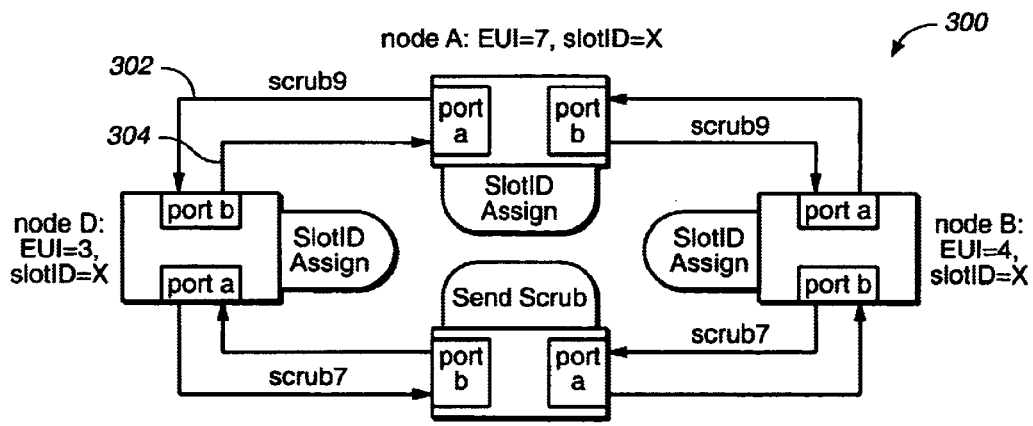
FIG._8F

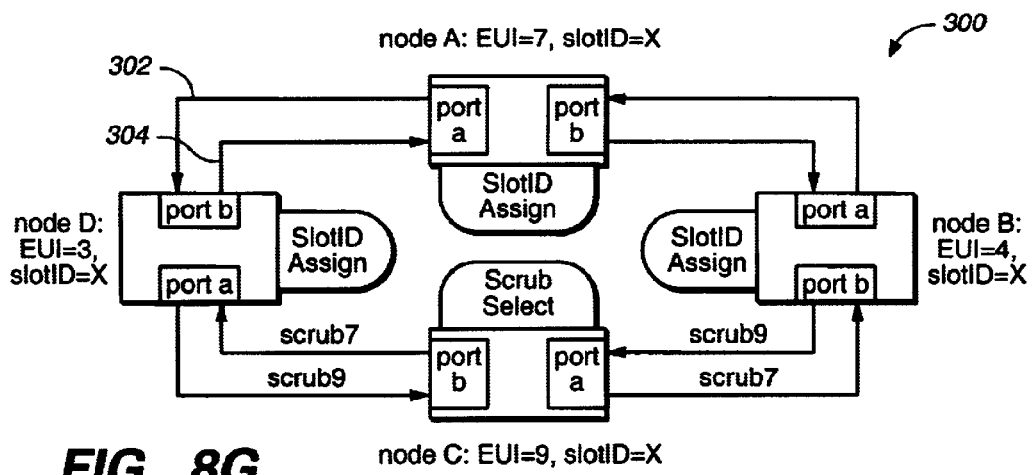
FIG._8G
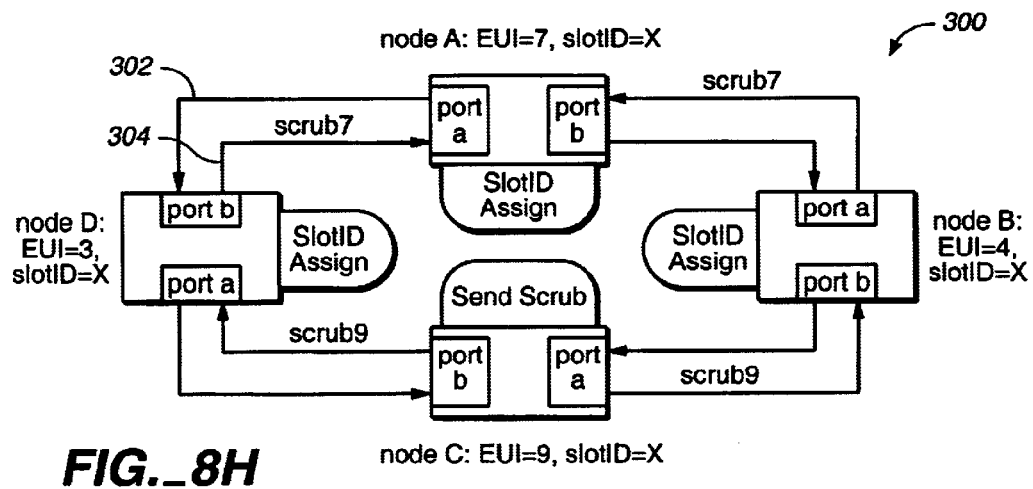
FIG._8H

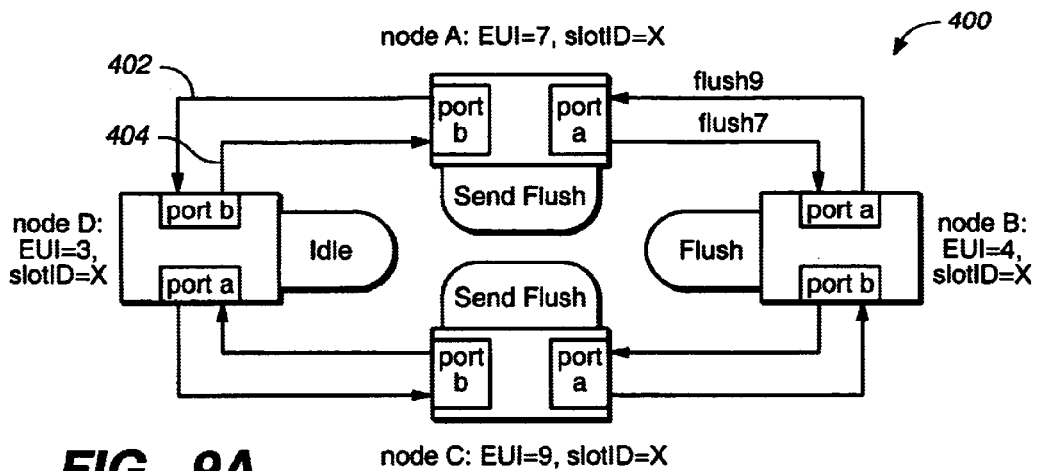
FIG._9A
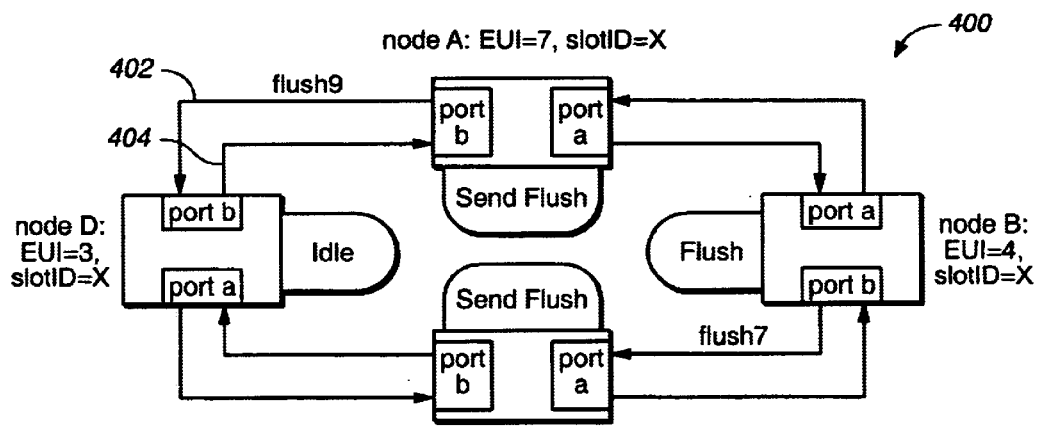
FIG._9B
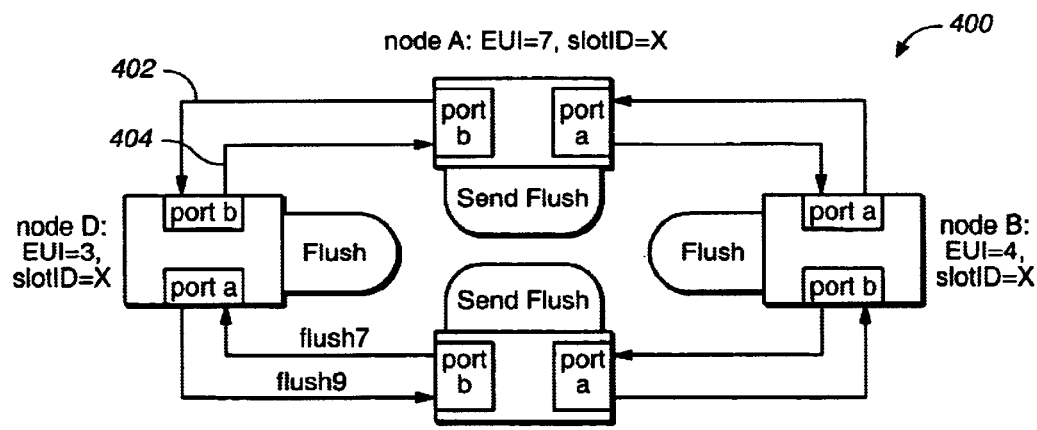
FIG._9C

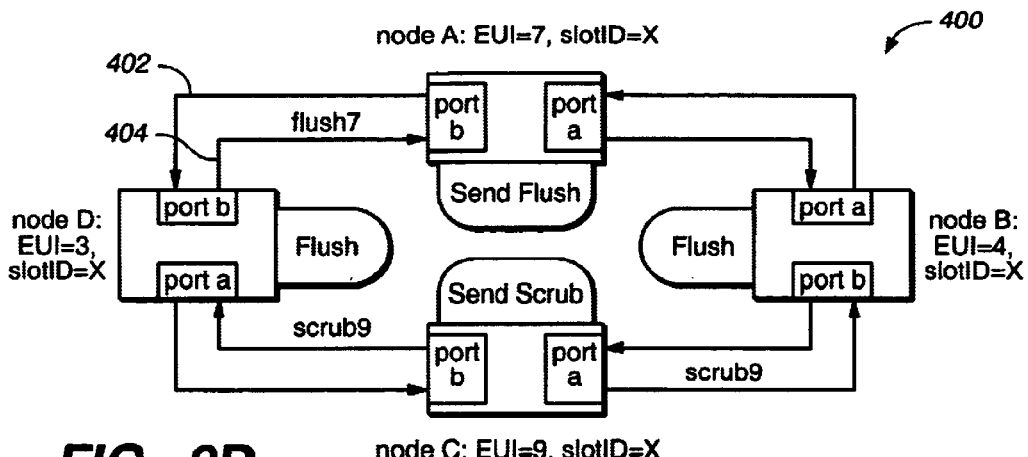
FIG._9D
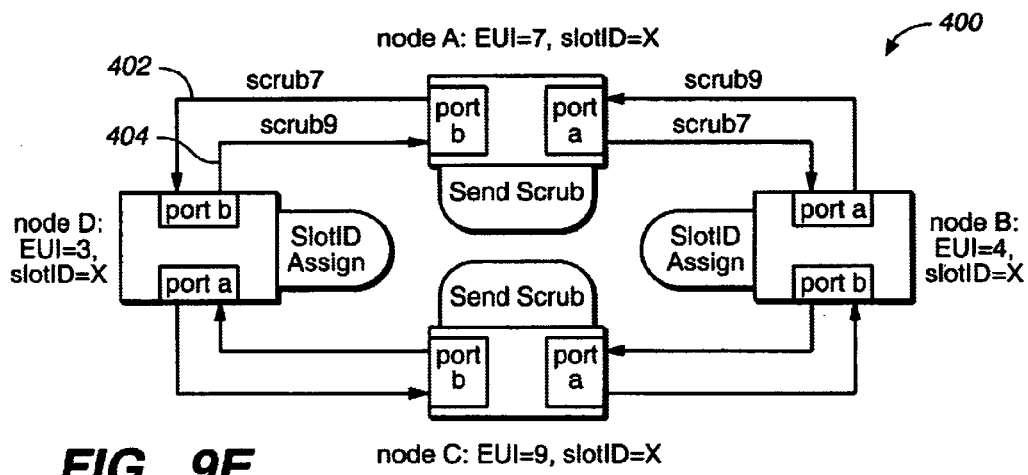
FIG._9E
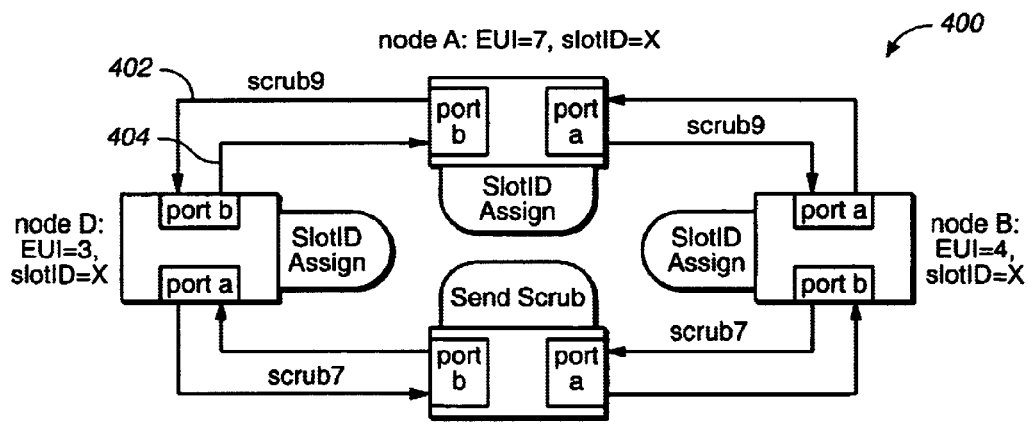
FIG._9F

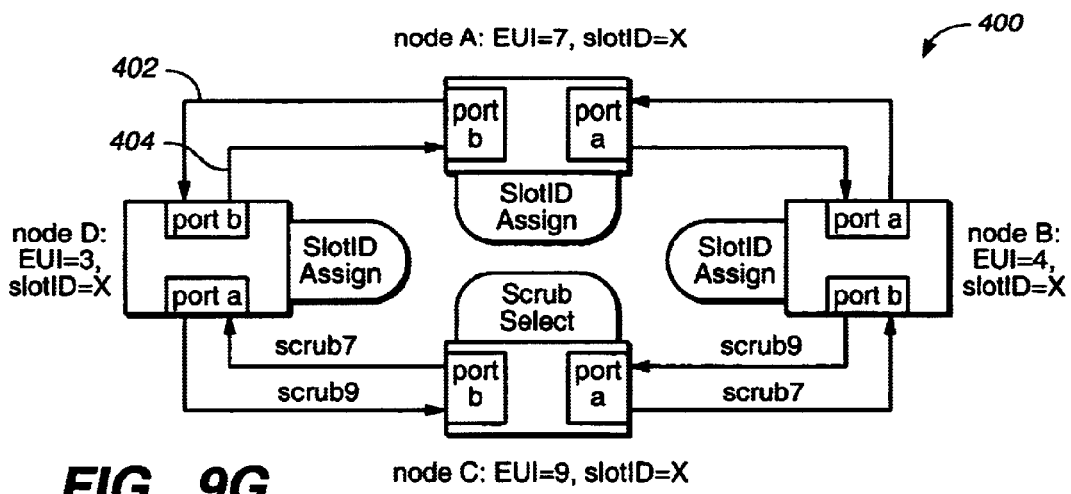
FIG._9G
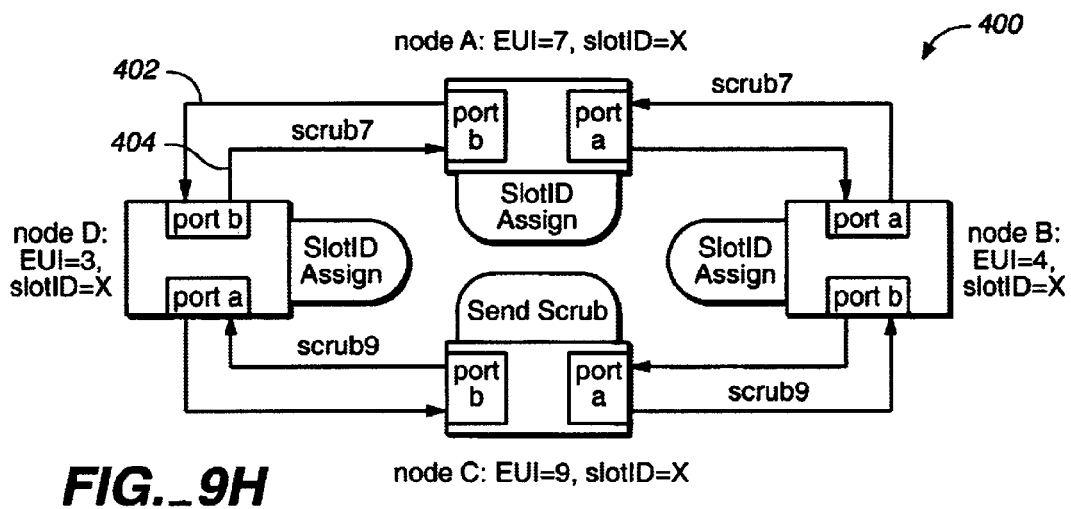
FIG._9H

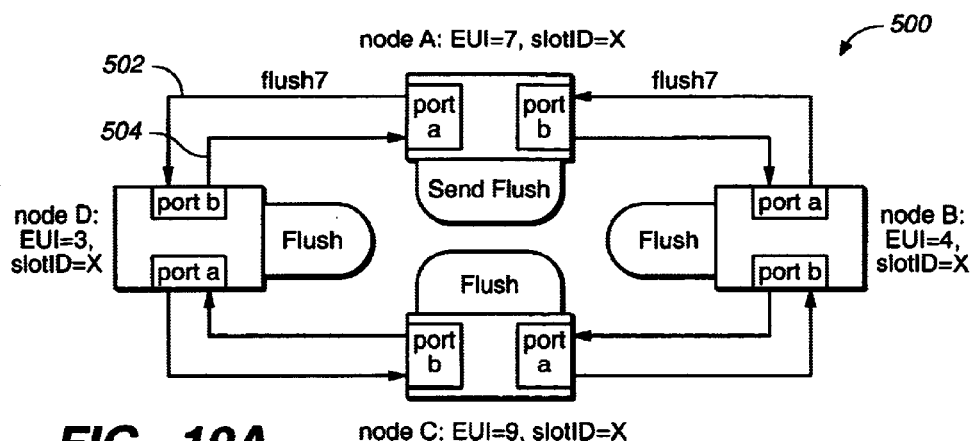
FIG._10A
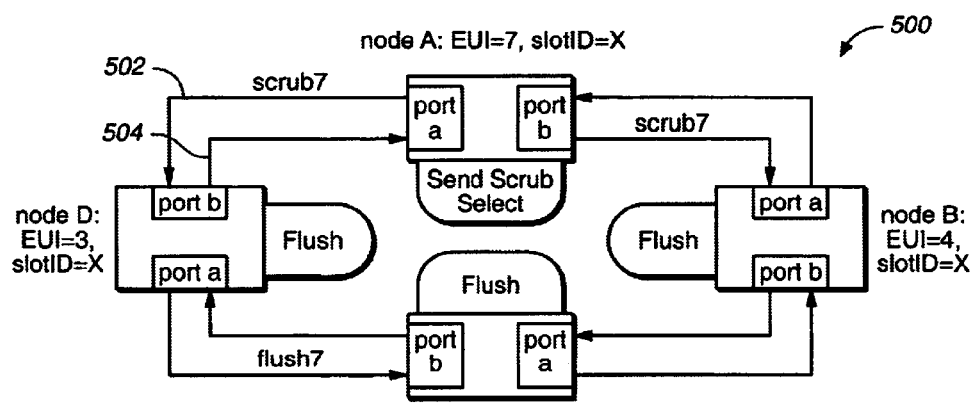
FIG._10B
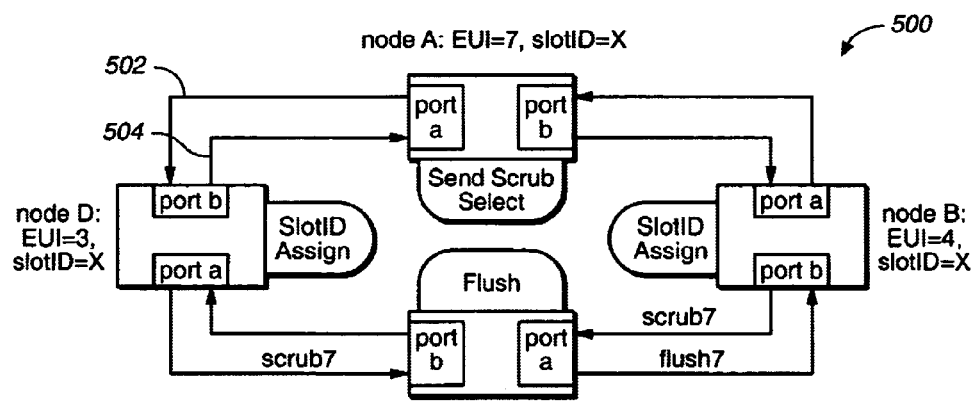
FIG._10C

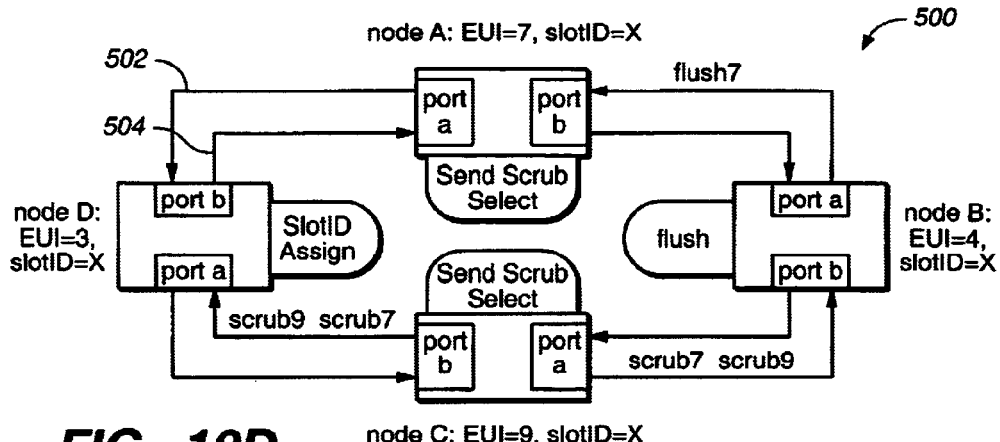
FIG._10D
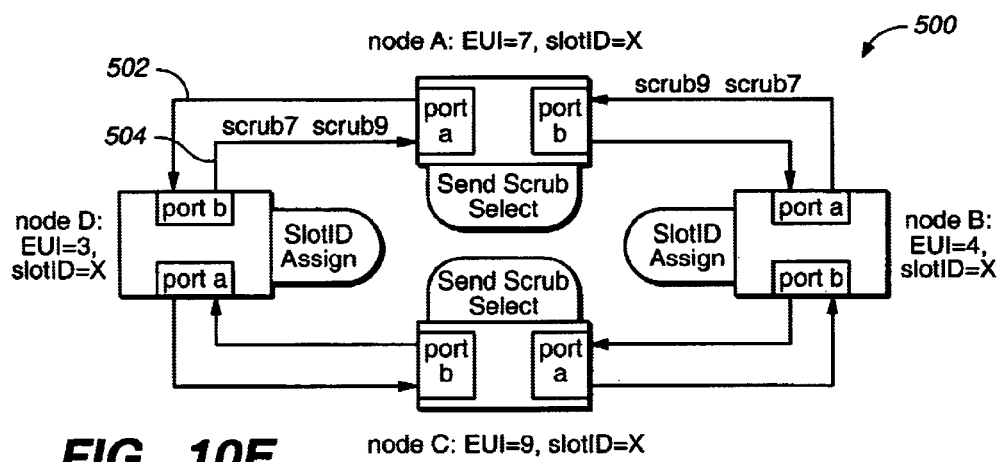
FIG._10E
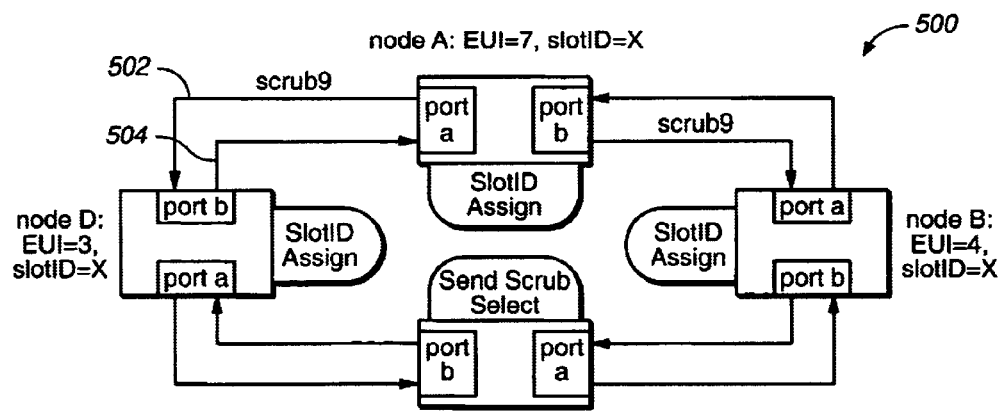
FIG._10F

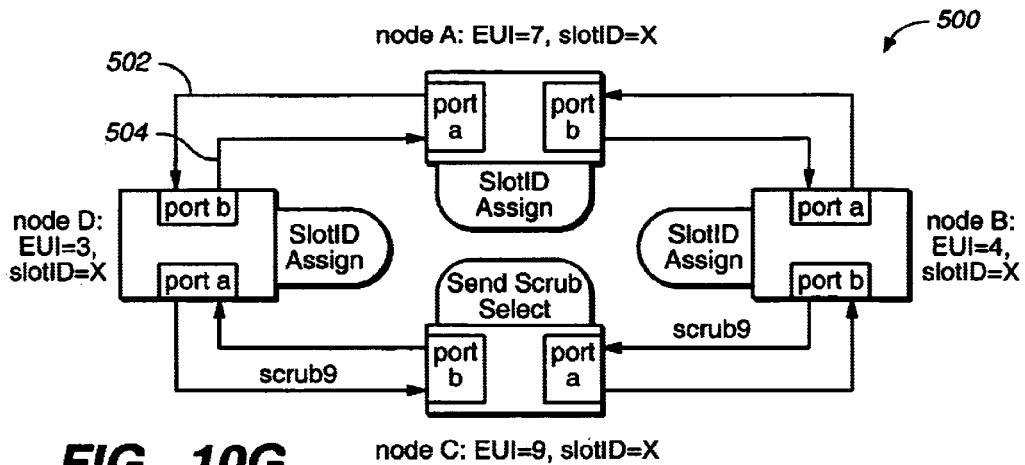
FIG._10G
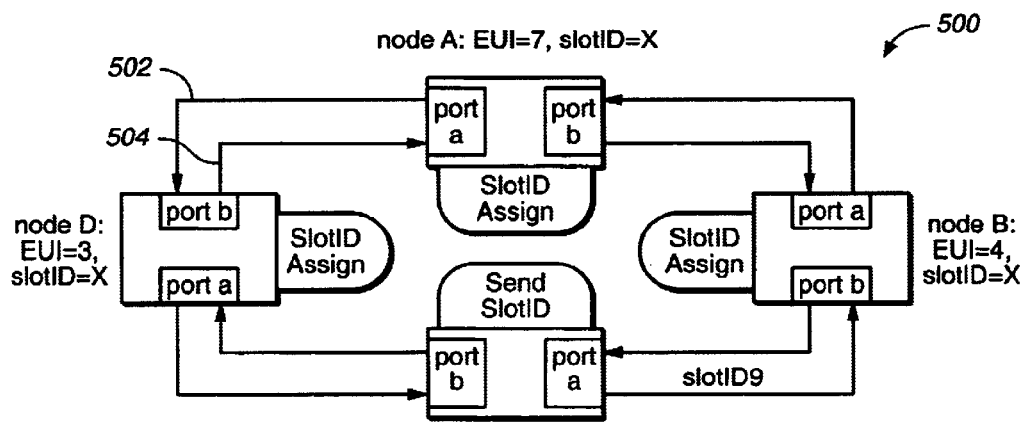
FIG._10H
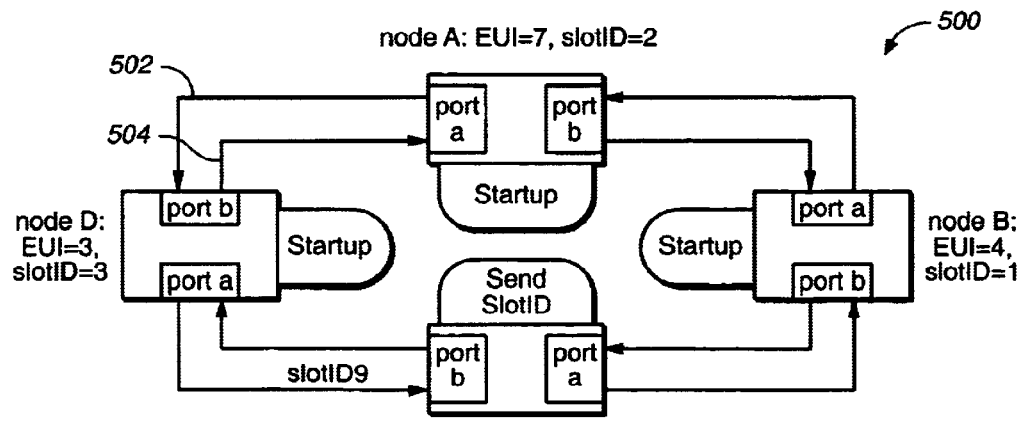
FIG._10I

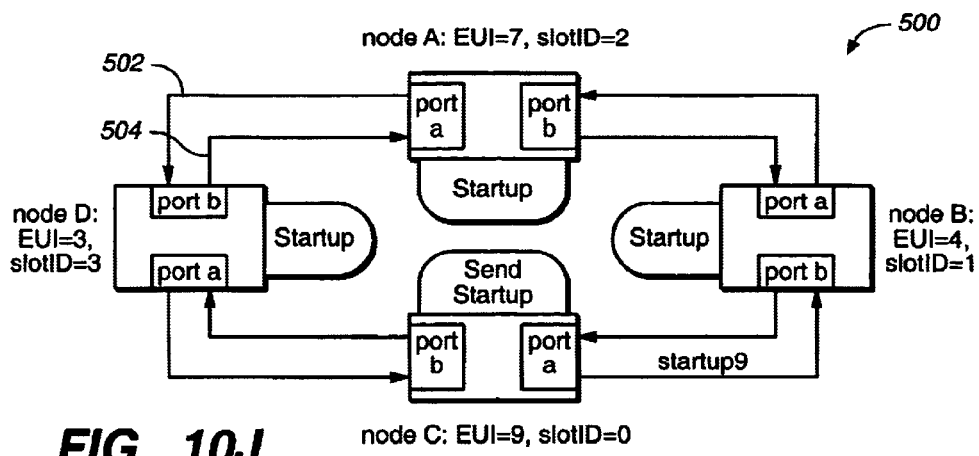
FIG._10J
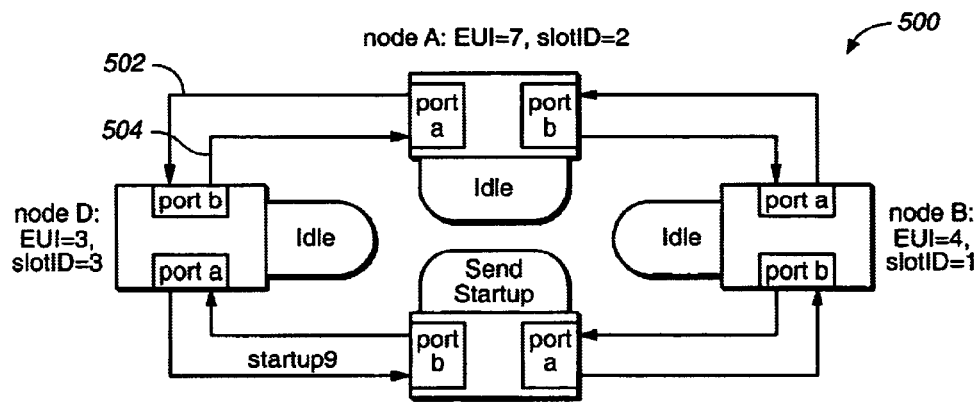
FIG._10K

RESET SEQUENCE FOR SEGMENTED COMPUTER NETWORK TOPOLOGY

BACKGROUND OF THE INVENTION

The present invention relates to segmented network topologies and, more specifically, a reset sequence for a segmented network topology.

A segmented computer network is a network that is broken up into groups in order to contain broadcast traffic and improve performance. Segmented networks seamlessly provide access to resources located on different network hosts (or "nodes") in each group using a shared communications bus. The nodes in each group are connected to one another through a single communications ring or a pair of counter-rotating rings, for example. In a standard segmented network, each node monitors activity on the ring. Messages are detected by all nodes on the ring, but are accepted (or stripped) by the node or nodes to which they are addressed. Segmented network performance is achieved by using point to point links rather than slower bused wires and by supporting concurrent communication on non-overlapping segments.

Initialization of a segmented computer network presents challenges not found in other more traditional bus architectures. The segmented nature of the network prevents information sent from a network participant (a node) from reaching the destination nodes at the same time, or within a boundary of time. Likewise, the status of other nodes in the network cannot be ascertained by a node at any particular time. Communications delays are highly dependent on network topology, network traffic, and node design. All of these factors may contribute to communications delay differences between different nodes. These communications delay differences make network initialization difficult. Thus, a reset sequence is desired for reliably initiating communications over a segmented communications network bus.

SUMMARY OF THE INVENTION

The present invention provides a method of resetting a segmented computer network topology having a plurality of network hosts, which are coupled in a ring. The method includes initiating a reset sequence having a flushing phase, a subsequent scrubber selection phase, a next subsequent slot identification phase and a next subsequent ring start-up phase. Selected packets received by the network hosts are flushed from the ring during the flushing phase. A single one of the network hosts is selected as a scrubber host during the scrubber selection phase. A unique slot identifier is assigned to each of the network hosts during the slot identification phase. A ring start-up packet is sent from the scrubber host to each of the other network hosts over the ring during the ring start-up phase.

Another aspect of the present invention relates to a segmented computer network topology, which includes a segmented computer network and a plurality of network hosts which are coupled in a ring within the segmented computer network. The plurality of network hosts are adapted to implement a reset sequence having a first, reset flushing phase, a second, scrubber selection phase, a third, slot identification assignment phase and a fourth, ring start-up phase.

Another aspect of the present invention relates to a segmented network host comprising a host identifier and first and second opposite ports. The segmented network host is adapted to execute a segmented network reset sequence including steps of: receiving a flushing reset packet through one of the first and second ports and responsively sending the flushing reset packet out the other of the first and second ports and responsively discarding selected additional packets received through at least one of the first and second ports; receiving scrubber selection packets through at least one of the first and second ports and responsively sending the scrubber selection packets out the other of the first and second ports, wherein each scrubber selection packet carries a host identifier variable; selecting the network host as a scrubber host or a non-scrubber host based on whether the unique host identifier of the network host has a predetermined relative magnitude as compared to the host identifier variables carried by the scrubber selection packets; assigning the host a slot identifier and sending a slot assignment packet carrying a slot identifier variable out one of the first and second ports, if the network host is selected as a scrubber host; receiving a slot assignment packet, which carries a slot identifier variable, through one of the first and second ports, assigning the network host a slot identifier based on the slot identifier variable, and sending the slot assignment packet out the other of the first and second ports, if the network host is selected as a non-scrubber host; and sending a ring start-up packet through one of the first and second ports if the network host is selected as a scrubber host or waiting to receive the ring start-up packet through one of the first and second ports if the network host is selected as a non-scrubber host.

Yet another aspect of the present invention relates to a reset packet for use in a reset sequence of a segmented network topology. The reset packet includes a reset phase field, an extended unique identifier field and a slot assignment variable field. The reset phase field indicates whether the reset sequence is in a reset flushing phase, a scrubber selection phase, a slot identifier assignment phase or a ring start-up phase.

BRIEF DESCRIPTION OF THE DRAWINGS

FIG. 1 is a diagram of a segmented computer network having a single ring topology.

FIG. 2 is a diagram of a segmented computer network topology having a counter-rotating ring topology.

FIG. 3 is a diagram of a bus reset packet protocol according to one embodiment of the present invention.

FIG. 4 is a diagram illustrating four possible values of a reset phase field in the bus reset packet protocol shown in FIG. 3.

FIG. 5 is a diagram of a bus reset sequence state machine, which is implemented within each node of a segmented network, according to one embodiment of the present invention.

FIGS. 6A–6O are schematic diagrams, which together illustrate a basic bus reset sequence of a four-node counter-rotating ringlet, according to one embodiment of the present invention.

FIGS. 7A–7S are schematic diagrams, which together illustrate a reset sequence of a segmented network topology having a single ring with cross-throughs formed at the two ends of the ring.

FIGS. 8A–8F are schematic diagrams, which together illustrate a reset sequence in which two high precedence nodes initiate reset sequences by sending bus reset packets offset in time and in the same ringlet direction.

FIGS. 9A–9H are schematic diagrams, which together illustrate a reset sequence in which two high precedence nodes initiate reset sequences by sending bus reset packets offset in time and in opposite ringlet directions.

FIGS. 10A–10K are schematic diagrams, which together illustrate a reset jitter sequence.

DETAILED DESCRIPTION OF THE ILLUSTRATIVE EMBODIMENTS

FIG. 1 is a diagram of a segmented computer network 10 having a single ring topology. Network 10 includes network hosts (or "nodes") A–E. Nodes A–E are coupled to one in a ring 12. Each node A–E is coupled within ring 12 through a pair of opposing ports, with each port having an input and an output. Nodes A–E pass communication packets to one another through ring 12 in the direction indicated by arrows 14. Nodes A and E are configured with cross-throughs (or loop-backs) 16 at the ends of ring 12, which essentially feed packets from the output of one port to the input of that same port to maintain the ring.

FIG. 2 is a diagram of a segmented computer network 20 having counter-rotating rings topology. Network 20 has a pair of counter-rotating rings 22 and 24. As in FIG. 1, nodes A–E each have a pair of opposing ports, with each port having an input and an output. Communication packets are passed from one node to the next over ring 22 in a counterclockwise direction. Communication packets are passed over ring 24 in a clockwise direction. The counter-rotating ring topology shown in FIG. 2 does not require cross-throughs or loop-backs.

The reset sequence of the present invention reliably initiates communications over a segmented network, such as those shown in FIGS. 1 and 2. The reset sequence has distinct reset sequence phases in order to overcome variable communications delays between the various nodes in the network. The reset sequence reliably selects a bus maintenance node (a scrubber node) for the segmented network, assigns hard identifiers to all nodes in the network based on their distance from the scrubber node, and provides a mechanism for commencing with normal network communications traffic.

In one embodiment, the reset sequence has four phases, including a reset flushing phase, a scrubber selection phase, a slot identification (ID) assignment phase, and a ringlet start-up phase. The particular phase of the reset sequence is communicated from one node to the next through a predefined reset phase field in each reset packet.

FIG. 3 is a diagram of a bus reset packet according to one embodiment of the present invention. Bus reset packet 30 includes a plurality of fields 31–42. Field 31 is a 16-bit target identifier field, which carries a unique "soft" or "hard" identifier that designates the node at which the packet is to be stripped, where "targetId=FFFF" indicates that the target identifier is a 16-bit hexadecimal value. Hard identifier addresses are assigned to each node during the bus reset sequence and are often referred to as slot ID's. Slot ID's reflect each node's distance from a scrubber node. Soft identifier addresses are assigned by software.

"RES" fields 33 and 41 are reserved. Sf field 32, type field 34, sCode field 35 and checksum field 42 are standard fields for reset packets, and are similar to those described in IEEE Standard P1394.2, entitled "Serial Express—A Scalable Gigabit Extension to Serial Bus", Draft 0.784 (May 3, 1997). Special format (sf) field 32 is "0" for the packet formats defined in the above-mentioned Standard, for example. Vendor-dependent packets have an sf value of "1". Type field 34 specifies the basic packet type as defined in the Standard, for example. For special packets, SCode field 35 specifies how the remaining packet fields shall be interpreted and the operation that shall be performed on the observing nodes, as defined in more detail in the Standard, for example. Checksum field 42 carries a checksum value for cyclic redundancy checking.

Reset phase (rPh) field 36 is a 2-bit field, which is unique to the reset sequence of the present invention and specifies the phase of the bus reset sequence being processed. FIG. 4 is a diagram illustrating the four possible values of reset phase field 36. An rPh value of "zero" indicates a bus reset packet for the flushing phase of the reset sequence. An rPh value of "1" indicates a bus reset packet for the scrubber selection phase of the reset sequence. An rPh value of "2" indicates a bus reset packet for the slotID assignment phase of the reset sequence. An rPh value of "3" indicates a bus reset packet for the start-up phase of the reset sequence.

Referring back to FIG. 3, reset precedence (rPr) field 37 is a 2-bit field, which is prepended to extended unique identifier (eui64) field 38 to form a scrubber selection number. Extended unique identifier field 38 is a globally unique number assigned to each node (or "host") during manufacturing. When a node originates a reset packet, eui64 field 38 is loaded with the extended unique identifier (EUI) of the originating node. The rPr field 37 allows software to override the extended unique identifier during a scrubber selection phase of the reset sequence. Software can set these two bits to make the combined value of rPr field 37 and eui64 field 38 larger than the combined value for the other nodes in the network. As described in more detail below, the combined value is used to select the scrubber node. In one embodiment, the node having the largest magnitude combined rPr and EUI value is selected as the scrubber node for the network. The EUI value is obtained from each node through non-volatile memory.

Slot count (slotCount) field 39 is a 7-bit field, which is used during the slot ID assignment phase of the reset sequence for assigning slotID values to each node. This field is also used for bus reset packet aging, as described in more detail below.

Port (p) field 40 is a 1-bit field used during the scrubber selection phase of the reset sequence to determine if a packet is received on the same port from which it was sent. This is used in a single ring topology, which requires that the node send the packet out on the opposing port in the same ring direction.

As mentioned above, the bus reset sequence of the present invention has four distinct phases, including a reset flushing phase, a scrubber selection phase, a slotID assignment phase and a ringlet start-up phase. These phases are discussed in order below.

1. Reset Flushing Phase

The first phase of the reset sequence is the reset flushing phase. This phase ensures that all nodes on the network ringlet stop previous bus reset sequence processing and prepare for a new bus reset sequence. The flushing phase starts when one or more of the nodes (referred as a bus reset initiating node) sends a bus reset packet with the rPh field indicating the reset flushing phase (a "flushing reset packet"). All nodes receiving a flushing reset packet terminate any previous bus reset processing, send the received flushing reset packet out the opposing port (in the same ring direction), and wait for the scrubber selection phase.

In the reset flushing phase, nodes discard any packets received with the exception of flushing reset packets and scrubber selection packets. Bus reset initiating nodes also discard scrubber selection packets while in the reset flushing phase. These nodes do not depend upon scrubber selection packets to signal a transition from the reset flushing phase to the scrubber selection phase. The removal of "rogue" flushing or scrubber selection reset packets is also accomplished through a packet aging mechanism, described in more detail below.

When a bus reset initiating node receives a flushing reset packet that it previously sent, the node begins the scrubber selection phase by sending a scrubber selection reset packet with the rPh field 36 indicating scrubber selection.

2. Scrubber Selection Phase

During the scrubber selection phase, a single one of the network nodes (or hosts) is selected as a scrubber node based on the relative magnitudes of the scrubber selection numbers ("SSNs") (a concatenation of the 2-bit reset precedence (rPr) field 37 and the 64-bit extended unique identifier (eui64) field 38), which are carried by the bus reset packets. For example, the node having the largest scrubber selection number is selected as the scrubber node. In an alternative embodiment, the node having the smallest scrubber selection number is selected as the scrubber node. Other criteria for selecting a scrubber node based on the relative magnitudes of the SSNs of each node can also be used.

When a node receives a scrubber selection reset packet, it begins the scrubber selection phase of the bus reset sequence. Nodes begin the scrubber selection phase by comparing the SSN in the first scrubber selection reset packet they receive with their own SSN. If the node's SSN is less than the SSN in the received packet, the node is no longer a potential scrubber node. The node sends the received scrubber selection reset packet out the opposing port (in the same ring direction) and then waits for the slotID assignment phase of the bus reset sequence.

If the node's SSN is greater than the SSN carried by the received scrubber selection reset packet, the node sends its own scrubber selection reset packet (carrying its own SSN) followed by the received scrubber selection reset packet. The received scrubber selection reset packet is sent out the opposing port from which the packet was received. The node's own scrubber selection reset packet is sent out both ports.

Nodes continue comparing their SSN with those received while sending received scrubber selection packets out the opposing port. If a received packet's SSN is greater than the node's SSN, the node is removed from the scrubber selection process. The node then waits for the slotID assignment phase.

When a node which remains in the scrubber selection process receives both of its own scrubber selection reset packets, the node is selected as the scrubber node if the node did not receive any scrubber selection reset packets from other nodes in between the time that it sends its scrubber selection reset packets and the time that it receives its scrubber selection reset packets. If the node receives other scrubber selection reset packets during that time, the node continues the selection process by again sending scrubber selection reset packets out both ports.

Nodes send their own scrubber selection reset packets out both ports because ringlet traversal delay on one run may be different from that on the other run. If nodes send their scrubber selection reset packets out only one port, it would be possible for two nodes, inserting scrubber selection reset packets on different runs, to be selected as scrubber nodes. This would violate a requirement that the bus reset sequence select only a single scrubber node.

Nodes which have dropped out of the scrubber selection process continue to send received scrubber selection reset packets out the opposing port unless the received packet was originated by that node. In this case, the packet is removed from the ringlet.

3. SlotID Assignment Phase

The slotID assignment phase of the bus reset sequence starts when the scrubber node is selected. In the slotID assignment phase, each node is assigned a unique slot identifier (slotID) value based on that node's distance from the scrubber node. First, the selected scrubber node assigns its own slotID value to a first value, such as zero. The scrubber node then increments the slotID value and places the value, as a slot assignment variable, in slotCount field 39 of a reset packet, which is sent out one of the two ports. This packet is referred to as a "slotID assignment reset packet" and has its rPh field 37 set to indicate the slotID assignment phase.

When a node in the slotID assignment phase of the bus reset sequence receives the slotID assignment reset packet, the node assigns its slotID value to equal the value of the slot assignment variable in slotCount field 39. The node then increments the slot assignment variable carried by the slotID assignment reset packet before sending the packet out the opposing port from which the packet was received. The slotID assignment reset packet is removed from the ringlet when it returns to the scrubber node, completing the slotID assignment phase of the bus reset sequence. The number of nodes on the ringlet is sent to all nodes during the ringlet start-up phase of the bus reset sequence. In an alternative embodiment, the slot assignment variable is negatively incremented (i.e. "decremented") or otherwise changed to a different value at each node. The step of incrementing can be performed before or after the node assigns its own slotID value as long as each node is assigned a unique slotID, which represents its distance from the scrubber node.

SlotCount field 39 allows over populated ringlets to be detected. Ringlets with greater than a predetermined number of nodes do not complete the bus reset sequence because aged packets are discarded before they return to the sending node. Residual reset packets can exist on a ringlet for a number of reasons. For example, the original sending node may have been removed from the ringlet or is no longer operational. Residual packets can also occur due to errors in eui64 field 38. These residual reset packets are removed as they occur. SlotCount field 39 is used as an aging mechanism. Nodes always increment the slot assignment variable in slotCount field 39 of received reset packets before sending the packets out the opposing port. If incrementing the slot assignment variable causes the variable to overflow, or exceed the predetermined value, the packet is considered a residual or "rogue" packet. The node then discards the packet by removing it from the ringlet.

4. Ringlet Start-up Phase

The ringlet start-up phase of the bus reset sequence informs all nodes on the ringlet that all of the unique node identifiers are assigned and normal packet transmission may commence. The scrubber node sends a start-up reset packet with rPh field 37 indicating start-up. The start-up reset packet may include information necessary for normal operation such as the number of nodes on the ringlet or an indication that each node should not change that node's soft ID. Nodes receiving the start-up reset packet may commence normal packet transmission after sending the packet out the opposing port. When the scrubber node receives the ringlet start-up reset packet, it may also commence normal packet transmission.

The bus reset sequence of the present invention supports single and counter-rotating ring topologies. In order to support single ring topologies with cross-throughs at the ends of the ring, each node must re-send their own reset packets out the opposing port when the packets are received on the port from which they were sent. The only case where this is not done is when the port has a cross-through (an end node on a single ring). This ensures that the reset packets pass through all ringlet nodes before being stripped by the sending node.

During the slotID assignment phase, if the slot assignment reset packet from another node is received on the same port from which it was sent, the slotID assignment for that node is not updated and the slot assignment variable in the slotCount field of the reset packet in not incremented. The packet is sent out the opposing port.

Single ringlet topologies are more easily supported by not merging the slotID assignment phase of the reset sequence with the scrubber selection phase of the reset sequence. With the bus reset sequence of the present invention, each node is required to store only its own scrubber selection number. It is not necessary to store the scrubber selection numbers for any of the other nodes since the reset sequence does not require each node to store a map of the network topology, as is required in other reset sequences.

Nodes that are configured in a pass-through mode by software do not participate in the bus reset sequence. These nodes may not have the timeout capability required for the bus reset sequence. Pass-through nodes simply send all received reset packets out the opposing port.

Bus Reset Sequence State Machine

FIG. 5 is a diagram of a bus reset sequence state machine 70, which is implemented within each node on the segmented network according to one embodiment of the present invention. State machine 70 executes the bus reset sequence discussed above and can be implemented in hardware, software or a combination of both hardware and software as desired.

State machine 70 includes a plurality of distinct states 72–80. The transitions from one state are indicated by arrows. Each arrow has a label with the following syntax: "Event/action, action . . . ", where "Event" refers to the event that causes the transition and "action" refers to any corresponding actions performed by the node. In addition to these actions, each node always re-sends any received reset packet carrying a scrubber selection number (SSN) not equal to its own SSN out the opposing port. Each node strips received reset packets carrying an SSN equal to its own SSN from ringlet. These actions are not explicitly shown in the state diagram of FIG. 5.

A bus reset sequence initiating node transitions from idle state 72 to send flush state 73, as indicated by arrow 81. The node then sends a flushing reset packet out one of its two ports. Non-reset initiating nodes that receive a flushing reset packet transition from any state, except send flush state 73, to reset flush state 74, as indicated by the two arrows labeled 82.

When a reset initiating node receives its own flushing reset packet, the node initiates the scrubber selection phase of the reset sequence by transitioning to send scrubber selection state 75, as indicated by arrow 83, and sending scrubber selection reset packets out both ports. Non-reset initiating nodes transition from reset flush state 74 to send scrubber selection state 75 or receive slotID assignment state 76 when they receive a scrubber selection reset packet other than their own. If the scrubber selection number (SSN) carried by the received packet is greater than the node's SSN, the node transitions to receive slot assignment state 76, as indicated by arrow 84. If the SSN carried by the received packet is less than the node's SSN, the node transitions to send scrubber selection state 75, as indicated by arrow 85 and sends scrubber selection reset packets out both ports.

The scrubber selection phase of the reset sequence is carried out between send scrubber selection state 75 and scrubber selection state 77. When a node receives a scrubber selection reset packet from another node, the SSN is compared with the node's own SSN, and the node continues with either the scrubber selection phase by transitioning to scrubber selection state 77 or goes to the slotID assignment phase by transitioning to slotID assignment state 76.

When a node receives both of its own scrubber selection reset packets (i.e., packets carrying an SSN equal to its own SSN) and if the node is currently in send scrubber select state 75 (no scrubber selection packets were received from other nodes), the node goes to send slotID state 78, as indicated by arrow 88. Otherwise, the node goes from scrubber selection state 77 to send scrubber selection state 75 (as shown by arrow 89), and continues with the scrubber selection process. When a node goes to send slotID state 78, it is the selected scrubber node for the ringlet.

The selected scrubber-node starts the slotID assignment phase of the reset sequence by sending a slotID assignment reset packet out one of its ports. All other nodes on the ringlet get their slotID assignment from the slot assignment variable carried in the slotCount field of the slotID assignment reset packet. These nodes then increment the slot assignment variable carried by the packet, send the packet out the opposing port from which it was received and transition from state 76 to start-up state 79, as indicated by arrow 90. The slotID assignment phase ends when the scrubber node receives the slotID assignment reset packet.

When the scrubber node receives the slotID assignment reset packet, the scrubber node goes to send start-up state 80 and begins the ringlet start-up phase as indicated by arrow 91. The scrubber node sends a ringlet start-up reset packet (a reset packet with rPh field 36 indicating start-up) out one of its two ports. Nodes receiving the ringlet start-up packet transition from star-up state 79 to idle state 72, as indicated by arrow 92, and begin normal packet transmission after sending the received start-up packet out the opposing port. The scrubber node transitions to idle state 72 and begins normal packet transmission after receiving the ringlet start-up reset packet, as indicated by arrow 93.

Reset Sequence Lock-up Prevention

The bus reset sequence state diagram shown in FIG. 5 prevents reset phase oscillations and other lock-up conditions, such as live-lock and dead-lock. The reset sequence prevents lock-up conditions by using two distinct "flushing" states 73 and 74. The nodes that initiate a bus reset sequence go to send flush state 73 and remain there until the next reset phase (the scrubber selection phase). Nodes that received a flushing packet go to flush state 74 and remain there until the next reset phase. Nodes that are in either of these flushing states do not change state when another flushing packet is received from another node.

Only nodes in send flush state 73 may initiate the next phase of the bus reset sequence. When one or more nodes initiate the next phase of the bus reset sequence, the nodes previously in send flush state 73 or flush state 74 transition out of those states. After nodes have left the flushing states and are in another reset phase, they go only to flush state 74

(not send flush state 73) when another flushing packet is received. In flush state 74, these nodes do not initiate the next phase of the bus reset sequence.

Also, "flushing" reset packets are only sent out when nodes transition from idle state 72 to send flush state 73. Therefore, once nodes have started the bus reset sequence, they cannot start another reset sequence by sending another flushing packet until they return to idle state 72. The only way to return to idle state 72 is to successfully complete all phases of the bus reset sequence, to timeout due to a ringlet error condition, or to lose state due to a link layer hardware error condition or a power condition, for example.

When multiple nodes initiate multiple bus resets, nodes that leave either of the flushing states 73 or 74 always end up in flush state 74 when they receive another flushing packet. The last node remaining in send flush state 73 initiates the next bus reset phase.

Because nodes in send flush state 73 remain in send flush state 73 when they receive another node's flushing packet, at least one node will always remain in send flush state 73 at the end of a sequence of bus resets initiated by one or more nodes. This allows the bus reset sequence to complete, barring any ringlet errors that prevent the circulation of bus reset packets.

Another feature that prevents lock-up conditions is that nodes in either of flushing states 73 and 74 strip and discard all incoming packets except flushing packets themselves and scrubber selection packets (in the case of nodes in flush state 74). This packet stripping ensures that the ringlet is clear of other bus reset phase packets and normal packets when the flushing phase completes. Subsequent phases of the bus reset sequence are not corrupted by any previous bus reset sequence packets.

EXAMPLE 1

Counter-rotating Ring Reset Sequence

FIGS. 6A–6O are schematic diagrams of a four-node counter-rotating ringlet, which illustrate a basic bus reset sequence according to one embodiment of the present invention. Ringlet 100 includes nodes (or "hosts") A–D, which are labeled with reference numerals 101, 102, 103 and 104, respectively. Each node A–D has two opposite ports, labeled "Port A" and "Port B". Port A and Port B each have an input and an output. For example, port A of node A has an input 105 and an output 106. Nodes A–D are coupled to one another to form a pair of counter-rotating rings, labeled 110 and 112.

Each node A–D is labeled with its node name, its extended unique identifier (EUI), its slot identifier (slotID), and the current state of its bus reset state machine. For example, node A has a node name "node A", an EUI equal to "7" and a slotID equal to "X", where the "X" indicates that a slotID has not yet been assigned to that node. Labels 114–117 indicate the current state of Nodes A–D. For example, node A is in the "Idle" state.

In FIG. 6A, nodes B and D initiate bus reset sequences by sending flushing reset packets through their port A outputs. Node B sends a flushing reset packet "flush4" out port A, and node D sends a flushing reset packet "flush3" out port A. The packet names indicate the type of packet and the EUI of the sending node that originated the packet. For example, "flush4" indicates a flushing reset packet originated by the node having an EUI equal four.

All nodes receiving flushing reset packets flush4 and flush3 terminate any previous bus reset processing, send the received flushing reset packet out the opposing port from which it was received and wait for the scrubber selection phase.

In FIG. 6B, node A passes flushing reset packet flush4 from port B to port A and enters the flush state. Similarly, node C passes flushing reset packet flush3 from port B to port A and enters the flush state. Flushing reset packets flush4 and flush3 continue to be passed around ring 110 until they return to their originating nodes, node B and node D, as shown in FIGS. 6C and 6D.

In FIG. 6E, the scrubber selection phase starts. Nodes B and D have received the flushing reset packets that they previously sent and transition to the send scrub select state. Node B sends scrubber selection reset packets, labeled "scrub4", out ports A and B. Similarly, node D sends scrubber selection reset packets, labeled "scrub3", out ports A and B. Nodes A and C remain in the flush state. In the following discussion, the scrubber selection reset packets will be simply referred to by their packet names, such as "scrub4".

In FIG. 6F, node A receives scrub4 on port B. Since the EUI of scrub4 is less than the EUI of node A, node A transitions from the flush state to the send scrub select state and sends its own scrubber selection reset packet, labeled "scrub7" followed by the received scrubber selection reset packet, scrub4, out the opposing port, port A. Node A also receives scrub3 on port A. Since the EUI of scrub3 is less than the EUI of node A, node A sends its own scrubber selection reset packet scrub7 out port B followed by the received scrub3.

Similarly, node C receives scrub4 on port A and scrub3 on port B. Since the EUI carried by scrub4 is less than the EUI of node C, node C sends its own scrubber selection reset packet, "scrub9", out port B, followed by scrub4. Since the EUI carried by scrub3 is less than the EUI of node C, node C sends its own scrubber selection reset packet, "scrub9", out port A followed by scrub3. Node C transitions from the flush state to the send scrub select state.

Referring to FIG. 6G, scrubber selection continues. Node B receives scrub7 and scrub 3 on port A and passes scrub7 and scrub 3 out opposing port B. Since scrub7 carries an EUI that is greater than the EUI of node B, node B is removed from the scrubber selection process and transitions from the send scrub select state to the slotID assignment state. Node B also receives scrub9 and scrub 3 on port B and passes scrub9 and scrub3 out opposing port A. Node D receives scrub9 and scrub4 on port A and passes scrub9 and scrub4 out opposing port B. Since scrub9 carries an EUI that is greater than the EUI of node D, node D is removed from the scrubber selection process and transitions to the slotId assignment state. Node D also receives scrub7 and scrub4 on port B and passes scrub7 and scrub4 out opposing port A.

In FIG. 6H, node A receives scrub9 and scrub4 on port A and passes scrub9 and scrub4 out opposing port B. Since scrub9 carries and EUI that is greater than the EUI of node A, node A is removed from the scrubber selection process and transitions to the slotID assignment state. Node A also receives scrub9 and scrub3 on port B and passes scrub9 and scrub3 out port opposing port A.

Node C receives scrub7 and scrub3 on port A and passes scrub7 and scrub3 out opposing port B. Similarly, node C receives scrub7 and scrub4 on port B and passes scrub7 and scrub4 out opposing port A. Since the EUIs of scrub3, scrub4 and scrub7 are less than the EUI of node C, node C transitions from the send scrub select state to the scrub select state. Node C does not transition to the send slotID state since it has not yet received both of its own scrubber selection packets.

In FIG. 6I, nodes B and D remain in the slotID assignment state and continue to receive packets on one port and pass the packets out the opposing port. However, nodes B and D strip scrub4 and scrub3, respectively, from the ringlet since these packets carry EUIs equal to the EUIs of nodes B and D.

In FIG. 6J, scrubber selection continues. Node A receives its own scrubber selection packets, scrub7, on ports A and B and strips these packets from the ringlet. Node C also receives its own scrubber selection packets, scrub9, on port A and port B. However, since node C received scrubber selection packets originated by other nodes since the time it sent out its own scrubber selection packets, node C transitions from the scrub select state back to the send scrub select state and sends its own scrubber selection packets, scrub9, out both ports A and B. These packets continue to be passed around the ringlet by nodes A, B and D.

The intermediate steps from when node C sends scrubber selection packets, scrub9, out ports A and B to when node C receives the same packets are omitted.

In FIG. 6K, node C receives its own scrubber selection packets, scrub9, on ports A and B and has not received any scrubber selection packets originated from other nodes. Therefore, the scrubber selection phase completes, and node C is selected as the scrubber node.

In FIG. 6L, the slotID assignment phase begins. Node C transitions from the send scrub select scrub state to the send slotId state and assigns its own slotID to "0". Node C increments the slotID variable from "0" to "1" and passes the slotId variable out port A within a slotId assignment packet, labeled "slotID9". Nodes B, A and D sequentially receive slotID9 on port A, assign their slotID to equal the current slotID assignment variable carried by slotID9, increment the slotID assignment variable carried by the packet and then pass the packet out the opposing port A. This process continues until the slotID assignment packet returns to node C, as shown by FIG. 6M.

The intermediate steps from when node C sends slotID9 out port A to when node C receives slotID9 on port B are omitted.

In FIG. 6M, the slotID assignment phase completes. Node B has been assigned slotID "1", node A has been assigned slotID "2", and node D has been assigned slotID "3" based on the distance of each node from scrubber node C.

In FIG. 6N, the ringlet start-up phase begins as node C transitions from the send slotID state to the send start-up state. In FIG. 6M, nodes B, A and D transition from the slotID assignment state to the start-up state as each node receives the slotID assignment packet. Node C sends a ringlet start-up packet labeled "startup9", out port A. As each node B, A, D and C receives startup9, that node transitions to the idle state, and normal packet transmission may commence. The intermediate steps during which startup9 is passed sequentially through nodes B, A and D and back to node C are omitted.

In FIG. 6O, the start-up phase completes as node C receives startup9 on port B.

EXAMPLE 2

Single Ring Basic Reset Sequence

FIGS. 7A–7S are schematic diagrams of a segmented network topology having a single ring with cross-throughs formed at the two ends of the ring. The same naming conventions are used in FIGS. 7A–7S as were used in FIGS. 6A–6O. Segmented network 200 includes nodes A–D which are coupled together through a single ring 202. Nodes C and D are located at the ends of ring 202. Node C is configured with a cross-through in port A, and node D is configured with a cross-through in port B, as is well known in the art. In FIG. 7A, node B initiates a bus reset sequence by sending a reset flushing packet "flush4" out port A. Node B enters the send flush state, and nodes A, C and D remain in the idle state.

The flush phase continues in FIGS. 7B–7F as each node receives flush4 on one port and sends flush4 out the opposing port. As each node receives flush4, that node transitions from the idle state to the flush state. In order to support the single ring topology with cross-throughs at the ends of the ring, the nodes must re-send their own reset packets out the opposing port when the packets are received on the same port from which they were sent. This ensures that the reset packets pass through all ringlet nodes before being stripped by the sender. For example, in FIG. 7D, node B receives flush4 on port A (the node from which it was sent) and re-sends flush4 out port B so that flush4 passes through node C. When flush4 finally returns to node B on port B, as shown in FIG. 7F, node B strips flush4 from ring 202. The reset flushing phase completes.

In FIG. 7G, the scrubber selection phase begins. Node B transitions from the send flush state to the send scrub select state and sends scrubber selection packets "scrub4" out ports A and B. The scrubber selection phase continues in FIGS. 7H–7O as each node compares the EUI of received scrubber selection packets to its own EUI. This procedure is similar to that described above with reference to FIGS. 6E–6K.

In FIG. 7N, node C receives its own scrubber selection packet "scrub9" on port A, but had received scrubber selection packets originated from other nodes since the time node C originated scrub9 on port A. Therefore, node C transitions from the scrub select state (shown in FIG. 7M) to the send scrub state (shown in FIG. 7N) and re-sends scrub9 out port A. Scrub9 is passed through nodes B, A and D and then back to node C through ring 202. In FIG. 7O, node C receives scrub9 on port A, the scrubber selection phase completes and node C is selected as the scrubber node.

In FIG. 7P, the slotID assignment phase begins as node C assigns its own slotID to "0" and sends slotID assignment packet, slotID9, out port A. SlotID9 is passed around ring 202, with nodes B, A and D being assigned slotID values of "1", "2" and "3", respectively, until slotID9 returns to node C, as shown in FIG. 7Q. The intermediate steps are omitted from the figures. In FIG. 7Q, slotID9 returns to node C.

The ringlet start-up phase begins in FIG. 7R. Node C sends a ringlet start-up packet, "startup9", out port A, which is passed around ring 202 until it returns to node C, indicating the completion of the bus reset sequence. As each node receives startup9, that node transitions to the idle state for normal packet transmission, as shown in FIG. 7S. When startup9 returns to node C, the ringlet start-up phase completes, and node C also transitions to the idle state.

EXAMPLE 3

Multiple Initiator Sequence A

FIGS. 8A–8F are schematic diagrams of a segmented network having counter-rotating rings. FIGS. 8A–8F illustrate an example in which two high precedence nodes (nodes having high EUI values) initiate bus reset sequences by sending bus reset packets offset in time and in the same ringlet direction.

In FIG. 8A, node A initiates a reset sequence by sending a flushing reset packet "flush7" before receiving a previous flushing packet "flush9" originated by node C. The flushing phase continues in FIG. 8B. In FIG. 8C, the node C flush completes as node C receives its own flushing reset packet "flush9" on port B. Node C strips flush9 from ring 302 and transitions from the send flush state to the send scrubber selection state. However, the node A flush continues as node C passes flush7 from port B to port A. Node C does not transition to the flush state since it was previously in the send flush state. (See FIG. 5).

In FIG. 8D, the node C scrubber selection phase begins as node C sends scrubber selection packets "scrub9" out ports A and B. The node A flush completes as node A receives flush7 on port B.

In FIG. 8E, the node C scrubber selection phase continues, and the node A scrubber selection phase begins. The scrub9 packets pass through nodes B and D, which transition to the slotID assignment state since they have a smaller EUI than that carried by scrub9. Node A sends scrubber selection packets "scrub7" out ports A and B.

In FIG. 8F, the scrubber selection phases of nodes C and A continue. Node A transitions to the slotID assignment state since its EUI is less than that carried scrub9.

In FIG. 8G, scrubber selection continues as node C receives its own scrubber selection packets on ports A and B. Since node C received scrubber selection packets from other nodes, it re-sends scrub9 out ports A and B.

In FIG. 8H, scrubber selection continues. Since node A is in the slotID assignment state and receives its own scrubber selection packets on ports A and B, node A strips the scrub7 packets from rings 302 and 304. As the reset sequence continues, node C is selected as the scrubber node. The remaining steps in the sequence are identical to those in the basic reset sequence described with reference to FIGS. 6A–6O.

EXAMPLE 4

Multiple Initiator Sequence B

FIGS. 9A–9H are schematic diagrams of a segmented network 400 having a pair of counter-rotating rings 402 and 404. FIGS. 9A–9H illustrate a reset sequence in which two high precedence nodes initiate bus rest sequences by sending reset packets offset in time and in opposite ringlet directions.

In FIG. 9A, node A initiates a reset by sending flush7 out port A before receiving a node C flushing reset packet flush9. The flushing phase continues in FIG. 9B. In FIG. 9C, the node C flush completes as node C receives its own flushing reset packet, flush9, on port B. The node A flush continues.

In FIG. 9D, a node C scrubber selection phase begins, as node C enters the send scrubber selection state by sending scrubber selection packets "scrub9" out ports A and B. Also, the node A flush completes as node A receives flush7 on port B. In FIG. 9E, the node C scrubber selection continues. The node A scrubber selection begins as node A transitions to the send scrub selection state and sends scrubbers selection packets "scrub7" out ports A and B.

In FIGS. 9F–9H, the node C and node A scrubber selection phases continue. As the scrubber selection phases continue, the scrub7 packets are stripped by node A, and node C is selected as the scrubber node. The remaining steps in the sequence are identical to those in the basic reset sequence described with reference to FIGS. 6A–6O.

EXAMPLE 5

Reset Jitter Sequence

FIGS. 10A–10K are schematic diagrams of a segmented network 500 having a pair of counter-rotating rings 502 and 504 and illustrate a reset jitter sequence.

In FIG. 10A, node A had previously initiated a reset sequence by sending a flushing reset packet "flush7" out port A. An event, such as a power condition, then caused node A to lose state and start another reset sequence. The flushing reset packet "flush7" from the previous reset sequence is received on port B by node A just after the new flushing reset packet "flush7" from the current reset sequence is sent out port A. Node A treats the received packet as the packet that was just sent, thus beginning the scrubber selection phase of the reset sequence. Node A transitions to the send scrubber selection state in FIG. 10B and sends scrubber selection packets "scrub7" out ports A and B. The scrubber selection phase continues in FIGS. 10C and 10D. In FIG. 10E, node A strips flush7 from ring 502 (because it is in the send scrub select state), and the scrubber selection phase continues through FIG. 10F.

In FIG. 10G, the scrubber selection phase completes as node C receives both of its own scrubber selection packets "scrub9" on ports A and B. Node C is selected as the scrubber node and transitions to the send slotID state in FIG. 10H. Node C starts the slotID assignment phase as node C sends a slotID assignment packet "slotID9" out port A. The intermediate steps between the time node C sends slotID9 on port A and when node C receives slotID9 on port B are omitted. In FIG. 10I, the slotID assignment phase completes, and nodes C, B, A and D are assigned slotID values of "0", "1", "2", and "3", respectively.

In FIG. 10J, the ringlet start-up phase begins as node C sends a ringlet start-up reset packet "startup9" out port A. The intermediate steps between the time when node C sends startup9 out port A and when node C receives startup9 on port B are omitted. In FIG. 10K, the ringlet start-up phase completes as node C receives startup9 on port B and transitions from the send start-up state to the idle state.

Conclusion

The reset sequence and corresponding apparatus of the present invention reliably perform the tasks necessary to initiate communications on a segmented computer network. The tasks are performed in distinct reset sequence phases in order to overcome variable communication delays between nodes in the network. The reset sequence reliably selects a scrubber node for the network, assigns hard identifiers to all nodes in the network based on their distance from the scrubber node, and provides a mechanism for commencing with normal ringlet communications traffic.

The reset sequence has a advantage of being relatively simple. The reset sequence supports two-port nodes on counter-rotating rings or a single ring with cross-throughs at the ends of the ring. The ringlet topology is configured prior to execution of the bus reset sequence. The reset sequence does not configure loop-back or pass-through nodes, or in any way alter the ringlet topology.

The reset sequence uses a straightforward multi-phase reset sequence with normal (not continuous stream) packet sending. A simple two-state initial phase eliminates residual packets, prevents unnecessary reset sequencing or lock-up conditions, and does not require a reset sequence label or the complexity of associated maintenance. Normal packet sending also provides more distinct reset phase boundaries, simpler by-pass buffer maintenance, less ringlet reset traffic, faster reset sequences, and less residual packets than reset sequences that send continuous reset streams.

The reset sequence enables efficient implementation without the need for additional node precedence storage or reset sequence maintenance logic. Implementation is also simplified due to the single packet sending protocol. Continuous send stream protocols require additional complexity to manage sending while receiving continuous input streams.

The reset sequence of the present invention is relatively fast due to the small number of ringlet traversals required and the utilization of normal packet sending (not continuous sending). Minimal reset packet processing is required.

The reset sequence of the present invention is robust in the presence of errors. A simple Cyclic Redundancy Check ("CRC") protection scheme is used for reset packets, as is known in the art. A unique time-out mechanism for removing aged packets ensures forward progress during the bus reset sequence. The reset sequence has four phases for handling simultaneous, or closely spaced, reset sequence initiations from multiple nodes. Post-reset conditions, such as soft node identifier retention, are supported by the final bus reset phase. Residual bus reset packets are removed from the ringlet by the packet aging mechanism. This feature is provided to ensure that rogue packets (packets whose sending node is not operational on the ringlet) are removed from the ringlet so they do not impact subsequent reset sequences.

Although the present invention has been described with reference to preferred embodiments, workers skilled in the art will recognize that changes may be made in form and detail without departing from the spirit and scope of the invention.

What is claimed is:

1. A method of resetting a segmented computer network topology comprising a plurality of network hosts, which are coupled in a ring, the method comprising:
    initiating a reset sequence having a flushing phase, a subsequent scrubber selection phase, a next subsequent slot identification phase and a next subsequent ring start-up phase;
    flushing selected packets received by the network hosts from the ring during the flushing phase;
    selecting a single one of the network hosts as a scrubber host during the scrubber selection phase;
    assigning a unique slot identifier to each of the network hosts during the slot identification phase; and
    sending a start-up packet from the scrubber host to each of the other network hosts over the ring during the ring start-up phase.

2. The method of claim 1 wherein each network host has a unique host identifier, at least one of the network hosts initiates the new reset sequence, and, for each of the network hosts that initiates the reset sequence, the step of flushing selected packets comprises:
    placing the network host in a send flush state; and
    sending a flushing reset packet from the network host over the ring, wherein the flushing reset packet carries the unique host identifier of the network host that sent the flushing reset packet.

3. The method of claim 2 wherein for each of the network hosts in the send flush state, the step of sending a flushing reset packet comprises:
    receiving the flushing reset packet from another of the network hosts over the ring; and
    entering a send scrubber selection state if the unique host identifier carried by the flushing reset packet matches the unique host identifier of the network host that received the flushing reset packet.

4. The method of claim 2 wherein for each of the network hosts not in the send flush state, the step flushing selected packets comprises:
    receiving the flushing reset packet from the ring;
    entering a flush, state in response to receiving the flushing reset packet;
    passing the received flushing reset packet to another of the network hosts over the ring; and
    discarding selected additional packets received from the ring while in the flush state.

5. The method of claim 4 wherein for each network host in the flush state, the step of selecting a single network host as a scrubber host further comprises:
    receiving a scrubber selection packet from the ring, wherein the scrubber selection packet carries the unique network host identifier of the network host that sent the scrubber selection packet; and
    entering a receive slot identification state or a send scrubber selection state based on a comparison of the relative magnitudes of the unique network host identifier carried by the scrubber selection packet and the unique network host identifier of the network host that received the scrubber selection packet.

6. The method of claim 5 wherein the step of entering a receive slot identification state or a send scrubber selection state further comprises:
    receiving the scrubber selection packet on a first port of the network host in a first direction in the ring;
    sending the received scrubber selection packet out a second port of the network host, which is opposite to the first port, in the first ring direction, and entering the receive slot identification state, if the magnitude of the unique network host identifier carried by the scrubber selection packet is greater than the unique network host identifier of the network host that received the scrubber selection packet; and
    sending a scrubber selection packet having the network hosts's own unique host identifier out the first and second ports, followed by sending the received scrubber selection packet out the second port and entering the send scrubber selection state, if the magnitude of the unique network host identifier carried by the scrubber selection packet is less than the unique network host identifier of the network host that received the scrubber selection packet.

7. The method of claim 1 wherein each network host as a unique host identifier and wherein the step of selecting a single one of the network hosts as a scrubber host comprises selecting a single one of the network hosts based on the magnitudes of the unique host identifiers.

8. The method of claim 7 wherein the step of selecting a single one of the network hosts as a scrubber host further comprises placing at least one of the network hosts in a send scrubber selection state and, for each network host that is in the send scrubber selection state:
    receiving a scrubber selection packet from the ring, wherein the scrubber selection packet carries the unique host identifier of the network host that sent the scrubber selection packet;
    comparing the magnitude of the unique host identifier carried by the received scrubber selection packet and the magnitude of the network host's own unique network host identifier;

entering a send slot identification state if the unique host identifier carried by the received scrubber selection packet is equal to the network host's own unique host identifier and if that network host has not received any scrubber selection packets carrying one of the other network host's unique host identifiers since the time that the network host sent the received scrubber selection packet having the network host's own unique host identifier over the ring; and entering a receive slot identification state if the unique host identifier carried by the received scrubber selection packet has a predetermined relative magnitude as compared to the network host's own unique host identifier.

9. The method of claim 8 wherein each network host is coupled to the ring through opposing ports and wherein the step of entering the receive slot identification state comprises:

sending the received scrubber selection packet out the opposite port from the port on which the received scrubber selection packet was received.

10. The method of claim 8 wherein each network host is coupled to the ring through first and second opposing ports and wherein the network host that sent the scrubber selection packet sends the scrubber selection packet out the first and second ports.

11. The method of claim 1 wherein the step of assigning a unique slot identifier to each of the network hosts comprises:

assigning the unique slot identifier for each of the network hosts based on a relative distance of the network host from the scrubber host within the ring.

12. The method of claim 11 wherein the step of assigning a unique slot identifier to each of the network hosts further comprises:

assigning the scrubber host a first slot identifier;

setting a slot assignment variable to equal an increment of the first slot identifier;

sending a slot assignment packet from the scrubber host to the ring, wherein the slot assignment packet carries the slot assignment variable;

for each subsequent network host in the ring, receiving the slot assignment packet, assigning the unique slot identifier of that network host to equal the slot assignment variable carried by the received slot assignment packet, incrementing the slot assignment variable carried by the slot assignment packet and then sending the slot assignment packet to the next, further subsequent network host in the ring; and removing the slot assignment packet from the ring when the slot assignment packet returns to the scrubber host over the ring.

13. The method of claim 12 wherein the step of sending a start-up packet from the scrubber host to each of the other network hosts over the ring comprises sending the start-up packet after the step of removing the slot assignment packet.

14. The method of claim 12 wherein, for each subsequent network host in the ring, the step of assigning a unique slot identifier to each of the network hosts further comprises:

discarding the slot assignment packet if the step of incrementing the slot assignment variable carried by the slot assignment packet results in the slot assignment variable exceeding a selected threshold value.

15. The method of claim 1 wherein the method is implemented without storing a map for the segmented computer network topology on any of the network hosts.

16. A segmented computer network topology comprising:

a segmented computer network; and a plurality of network hosts which are coupled in a ring within the segmented computer network and are adapted to implement a reset sequence having a first, reset flushing phase during which flushing reset packets are passed from host to host in the network, a second, scrubber selection phase during which scrubber selection reset packets are passed from host to host in the network, a third, slot identification assignment phase during which slot identification reset packets are passed from host to host in the network and a fourth, ring start-up phase.

17. A segmented network host comprising a host identifier and first and second opposite ports and being adapted to execute a segmented network reset sequence comprising steps of:

receiving a flushing reset packet through one of the first and second ports and responsively sending the flushing reset packet out the other of the first and second ports and responsively discarding selected additional packets received through at least one of the first and second ports;

receiving scrubber selection packets, separate from the flushing reset packets, through at least one of the first and second ports and responsively sending the scrubber selection packets out the other of the first and second ports, wherein each scrubber selection packet carries a host identifier variable;

selecting the network host as a scrubber host or a non-scrubber host based on whether the unique host identifier of the network host has a predetermined relative magnitude as compared to the host identifier variables carried by the scrubber selection packets;

assigning the host a slot identifier and sending a slot assignment packet, separate from the flushing reset and scrubber selection packets and carrying a slot identifier variable out one of the first and second ports, if the network host is selected as a scrubber host;

receiving a slot assignment packet, which carries a slot identifier variable, through one of the first and second ports, assigning the network host a slot identifier based on the slot identifier variable, and sending the slot assignment packet out the other of the first and second ports, if the network host is selected as a non-scrubber host; and sending a ring start-up packet through one of the first and second ports if the network host is selected as a scrubber host or waiting to receive the ring start-up packet through one of the first and second ports if the network host is selected as a non-scrubber host.

18. A reset packet for use in a reset sequence of a segmented network topology, the reset packet comprising:

a reset phase field indicating whether the reset sequence is in a reset flushing phase, a scrubber selection phase, a slot identifier assignment phase or a ring start-up phase;

an extended unique identifier field; and a slot assignment variable field.

19. The reset packet of claim 18 and further comprising a reset precedence field which is prepended to the extended unique identifier field.

* * * * *